US011983567B2

(12) United States Patent
Park et al.

(10) Patent No.: US 11,983,567 B2
(45) Date of Patent: May 14, 2024

(54) PROCESSING DATA STREAM MODIFICATION TO REDUCE POWER EFFECTS DURING PARALLEL PROCESSING

(71) Applicant: QUALCOMM Incorporated, San Diego, CA (US)

(72) Inventors: Hee Jun Park, San Diego, CA (US); Richard Gerard Hofmann, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/982,574

(22) Filed: Nov. 8, 2022

(65) Prior Publication Data

US 2023/0078991 A1  Mar. 16, 2023

Related U.S. Application Data

(63) Continuation of application No. 16/834,986, filed on Mar. 30, 2020, now Pat. No. 11,507,423.

(51) Int. Cl.
*G06F 13/00* (2006.01)
*G06F 9/50* (2006.01)
*G06F 13/28* (2006.01)
*G06N 20/00* (2019.01)

(52) U.S. Cl.
CPC .......... *G06F 9/5027* (2013.01); *G06F 9/5094* (2013.01); *G06F 13/28* (2013.01); *G06N 20/00* (2019.01)

(58) Field of Classification Search
None
See application file for complete search history.

(56) References Cited

U.S. PATENT DOCUMENTS 6,128,416 A  * 10/2000 Oura ................... H04N 1/3876
382/284
6,788,302 B1  9/2004 Ditlow et al.
6,934,760 B1  8/2005 Westbrook et al.
(Continued)

OTHER PUBLICATIONS

Www.wikipedia.com, Direct Memory Access, Mar. 2014, pp. 1-9 (Year: 2014).*

(Continued)

*Primary Examiner* — Henry Tsai
*Assistant Examiner* — Dean Phan
(74) *Attorney, Agent, or Firm* — Patterson + Sheridan, L.L.P./Qualcomm

(57) ABSTRACT

Certain aspects of the present disclosure provide a method for performing parallel data processing, including: receiving data for parallel processing from a data processing requestor; generating a plurality of data sub-blocks; determining a plurality of data portions in each data sub-block of the plurality of data sub-blocks; changing an order of the plurality of data portions in at least one data sub-block of the plurality of data sub-blocks; providing the plurality of data sub-blocks, including the at least one data sub-block comprising the changed order of the plurality of data portions, to a plurality of processing units for parallel processing; and receiving processed data associated with the plurality of data sub-blocks from the plurality of processing units.

20 Claims, 17 Drawing Sheets

(56) References Cited

U.S. PATENT DOCUMENTS

| | | | |
|---|---|---|---|
| 9,774,508 B1 | 9/2017 | Barrett et al. | |
| 10,520,318 B2* | 12/2019 | Park | G08G 1/0969 |
| 11,507,423 B2 | 11/2022 | Park et al. | |
| 11,561,833 B1* | 1/2023 | Heaton | G06F 9/45504 |
| 2001/0020949 A1* | 9/2001 | Gong | H04N 1/40062 |
| | | | 345/593 |
| 2002/0163670 A1 | 11/2002 | Takahira | |
| 2003/0053706 A1* | 3/2003 | Hong | H04N 19/186 |
| | | | 382/253 |
| 2007/0019778 A1 | 1/2007 | Clouse et al. | |
| 2011/0205591 A1* | 8/2011 | Ushiku | G06K 15/1851 |
| | | | 358/1.15 |
| 2012/0089884 A1* | 4/2012 | Kamiya | H03M 13/1111 |
| | | | 714/752 |
| 2013/0024479 A1 | 1/2013 | Gong et al. | |
| 2019/0073590 A1 | 3/2019 | Wu et al. | |
| 2019/0149752 A1* | 5/2019 | Takahashi | H04N 23/80 |
| | | | 348/222.1 |
| 2020/0043173 A1 | 2/2020 | Wiemker et al. | |
| 2021/0240904 A1 | 8/2021 | Verma et al. | |

OTHER PUBLICATIONS

International Search Report and Written Opinion—PCT/US2021/070327—ISA/EPO—Jul. 5, 2021.

* cited by examiner

US 11,983,567 B2

PROCESSING DATA STREAM MODIFICATION TO REDUCE POWER EFFECTS DURING PARALLEL PROCESSING

CLAIM OF PRIORITY UNDER 35 U.S.C. § 119

The present application is a continuation of and claims priority to U.S. patent application Ser. No. 16/834,986 entitled "PROCESSING DATA STREAM MODIFICATION TO REDUCE POWER EFFECTS DURING PARALLEL PROCESSING" filed on Mar. 30, 2020 which is incorporated herein in its entirety.

INTRODUCTION

Aspects of the present disclosure relate to techniques for modifying processing data streams to reduce unintended and disruptive power effects during parallel processing.

Parallel processing is increasingly being implemented to improve performance of large data processing tasks. For example, the performance of machine learning and artificial intelligence systems may often be improved by implementing parallel processing in a processing system that includes multiple processing units or across multiple processing systems.

While parallel processing can generate significant performance benefits in many large data processing contexts, it can also create significant strain on processing systems. Such strain may lead to disruptive power effects, such as current spikes and voltage droops, which negatively affect processing system performance. For example, if multiple processing units of a processing system, such as a system on a chip (SoC), initiate an intensive data processing task simultaneously, the entire processing system may become degraded or unstable during the subsequent current spike and/or voltage droop. In such cases, the benefits of the parallel processing architecture are greatly diminished and performance for the end user is compromised. These issues may be particularly acute in mobile devices where power considerations are amplified.

Accordingly, systems and methods for modifying processing data streams to reduce disruptive power effects during parallel processing are needed.

BRIEF SUMMARY

Certain aspects provide a method for performing parallel data processing, including: receiving data for parallel processing from a requestor; generating a plurality of data sub-blocks; determining a plurality of data portions in each data sub-block of the plurality of data sub-blocks; changing an order of the plurality of data portions in at least one data sub-block of the plurality of data sub-blocks; providing the plurality of data sub-blocks, including the at least one data sub-block comprising the changed order of the plurality of data portions, to a plurality of processing units for parallel processing; and receiving processed data associated with the plurality of data sub-blocks from the plurality of processing units.

Further aspects provide a method for performing parallel data processing, including: receiving data for parallel processing from a requestor; determining a plurality of density ranges, wherein each density range of the plurality of density ranges is distinct from each other density range of the plurality of density ranges; determining a plurality of data portions of the data based on the density ranges; generating a plurality of data sub-blocks having resequenced data portions; providing the plurality of data sub-blocks to a plurality of processing units for parallel processing; and receiving processed data associated with the plurality of data sub-blocks from the plurality of processing units.

Further aspects provide non-transitory computer readable media comprising instructions that, when executed by one or more processors of a processing system, perform the aforementioned methods as well as those further described herein.

Further aspects provide a computer program product embodied on a computer readable storage medium comprising code for performing the aforementioned methods as well as those further described herein.

Further aspects provide processing system with one or more processors and/or other means configured to perform the aforementioned methods as well as those further described herein.

The following description and the related drawings set forth in detail certain illustrative features of one or more examples.

BRIEF DESCRIPTION OF THE DRAWINGS

The appended figures depict certain aspects of the one or more examples and are therefore not to be considered limiting of the scope of this disclosure.

To facilitate understanding, identical reference numerals have been used, where possible, to designate identical elements that are common to the drawings. It is contemplated that elements and features of one example may be beneficially incorporated in other examples without further recitation.

DETAILED DESCRIPTION

Aspects described herein relate to systems and methods for modifying processing data streams to reduce unintended and disruptive power effects during parallel processing. Such systems and methods improve the performance of parallel processing systems, such as those that include multiple processing units and/or those that coordinate multiple processing systems.

Generally, parallel processing capability may be provided in a single processor with multiple processing units (e.g., multiple processing cores of the processor), by multiple processors, which may each have one or more processing units, by multiple processing systems, each having their own processors, and by combinations of the same. Generally, multiple processors used for parallel processing may be homogeneous or heterogeneous is design, such as multiple central processing units (CPUs), or a central processing unit, graphical processing unit (GPU), neural signal processing unit (NPU), digital signal processor (DSP), and the like acting in coordination. An NPU, such as described herein, is generally a specialized circuit configured for implementing all the necessary control and arithmetic logic for executing machine learning algorithms, such as algorithms for processing artificial neural networks (ANNs), deep neural networks (DNNs), random forests (RFs), and the like.

As described in more detail below, modifying processing data streams to reduce disruptive power effects during parallel processing may be accomplished by analyzing data for parallel processing and resequencing (or rearranging, reordering, or changing) the data to avoid concurrent power spikes from multiple processing units. Resequenced processing data streams may thus reduce or eliminate undesirable power effects, such as processing power spikes, voltage droop, excess heat, additional leakage current, and others, in a processing system, which beneficially improves the performance and reliability of the processing system.

Further, the methods described herein may beneficially reduce peak current during parallel processing without employing conventional, detrimental performance degrading methods, such as frequency throttling and command stalling, to name a few examples.

Further yet, avoiding large processing power spikes may beneficially reduce thermal load in the system (from high, transient current flows). Reduced thermal loading may beneficially reduce cooling requirements and thus positively affect packaging possibilities. Additionally, reduced thermal loading may reduce thermal-induced leakage current and thus positively affect power efficiency.

The aforementioned benefits may significantly improve the performance of mobile devices in particular due to their inherent power design constraints.

Example Parallel Data Processing Architecture

Figure 1:
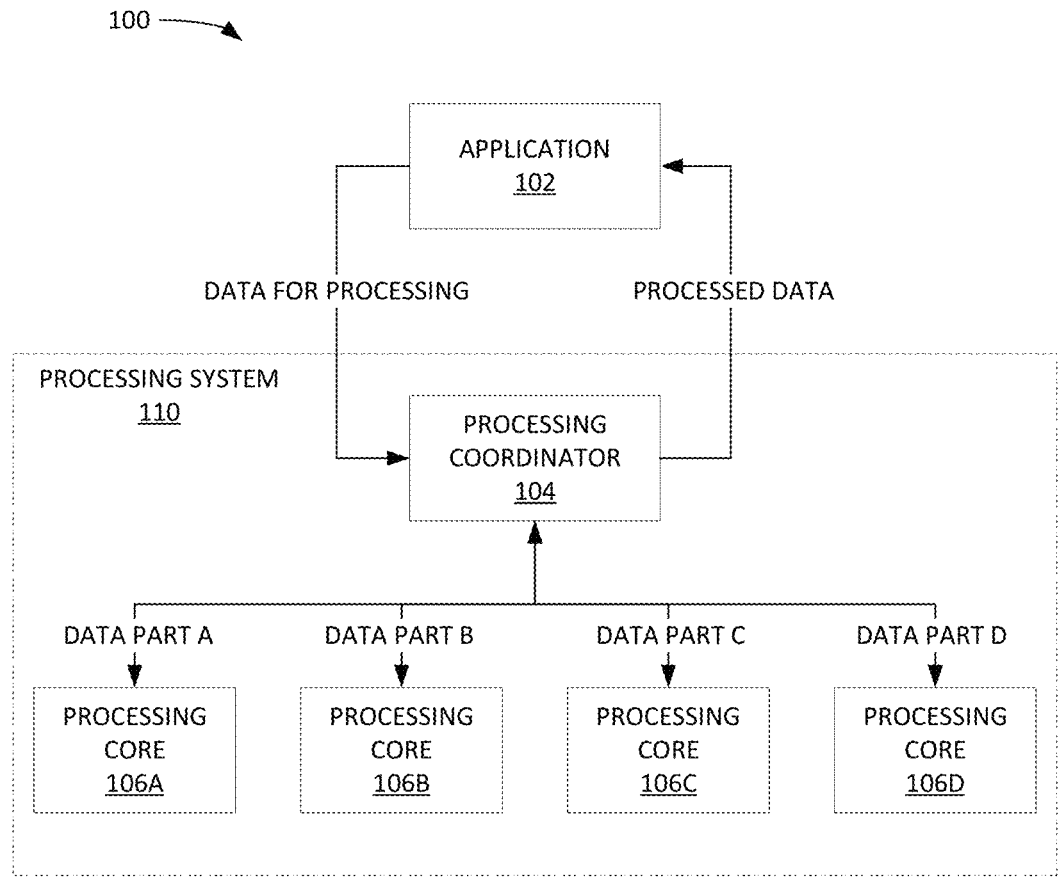
FIG. 1 depicts an example parallel data processing architecture.

FIG. 1 depicts an example parallel data processing architecture 100. In the depicted example, an application 102 provides data for processing to a data processing system 110, which includes a data processing coordinator 104 for coordinating parallel processing. Application 102 may be a local application (e.g., on a processing system) or a remote application (e.g., in a client-server architecture) and may generally be referred to as a data processing requestor.

Processing coordinator 104 may generally be a function implemented within a processing system configured to coordinate parallel processing of data, such as in a multiprocessor computing system (e.g., a computer, a server, a mobile device, a System on a Chip (SoC), an internet of things (IoT) or edge device, or generally within any multiprocessing unit system.

In this example, data processing coordinator 104 receives data from application 102 and coordinates the parallel processing of the data by providing data sub-blocks A-D to processing cores 106A-D. Data sub-blocks A-D may be data of any sort for parallel processing. In some examples, data sub-blocks A-D may include machine learning model or artificial intelligence model input data, such as image data, video data, audio data, or other quantitative data.

Data sub-blocks may generally relate to the blocks, tiles, tensors, or the like of data sent to multiple processing units (such as processing cores 106A-D) for parallel processing. In some examples, each data sub-block may represent a unique subset of a set of data for processing, while in other examples, each data sub-block may represent a repeated set of data to be processed differently on each of the processing units, such as processing the same data with different models. Thus, generating data sub-blocks may include generating mutually exclusive data subsets, or repeated data sets, for distribution to multiple processing units.

Figure 2:
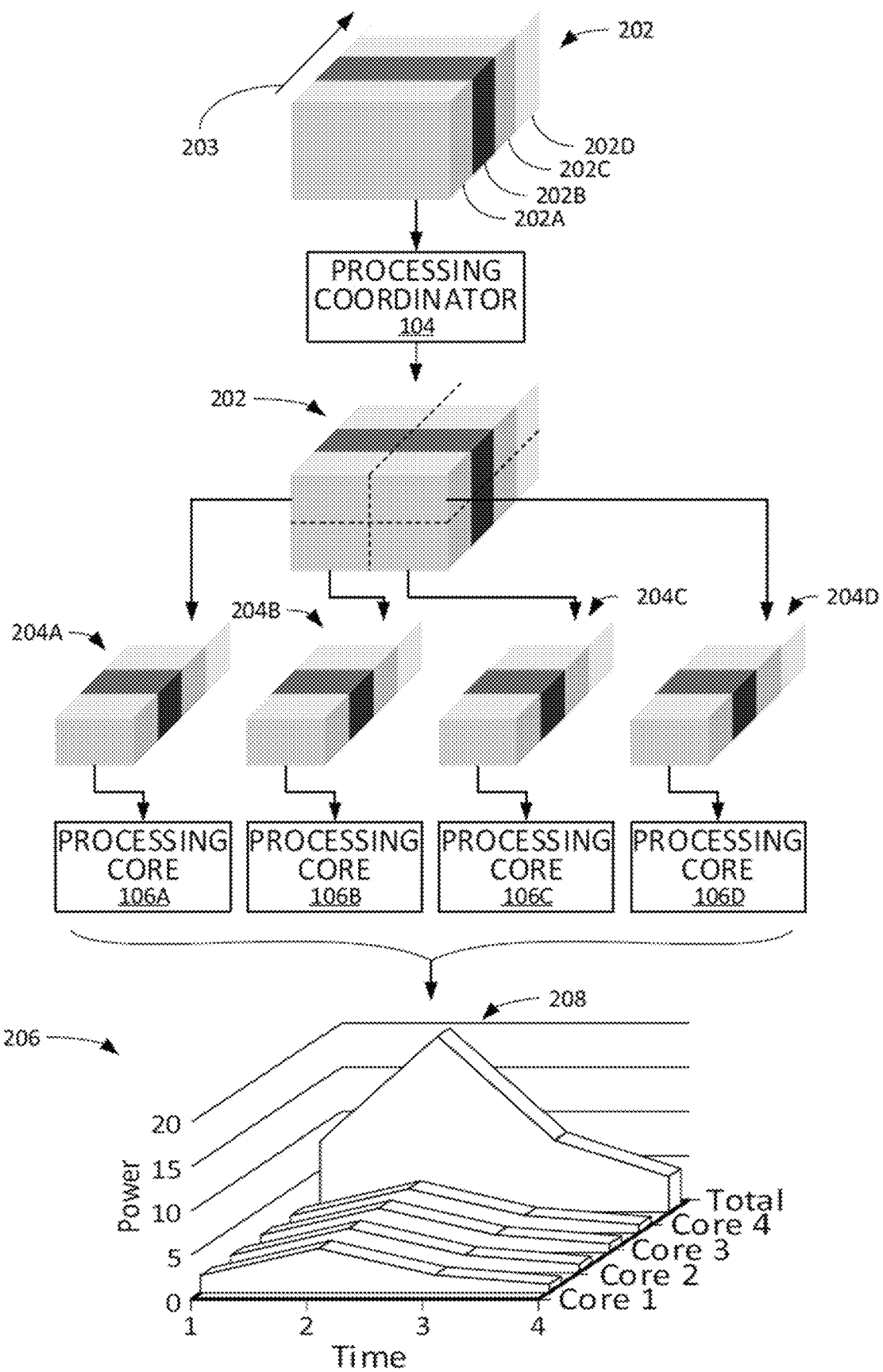
FIG. 2 depicts an example of generating a plurality of data sub-blocks based on a received data block by a processing coordinator.

FIG. 2 depicts an example of generating a plurality of data sub-blocks by a data processing coordinator, such as processing coordinator 104 of FIG. 1.

In this example, multi-dimensional data block 202 is provided to processing coordinator 104 for processing by a plurality of processing devices (e.g., for parallel processing), such as the multiple processing cores 106A-D. In some examples, data block 202 may be a tensor. Generally, an nth-rank tensor in m-dimensional space is a mathematical object that has n indices and $m^n$ components and obeys certain transformation rules. Each index of a tensor ranges over the number of dimensions of space. Thus, tensors may be generalizations of scalars (that have no indices), vectors (that have exactly one index), and matrices (that have exactly two indices) to an arbitrary number of indices.

Data block 202 includes different portions 202A-D, which have different densities (or conversely, sparsities), which are indicated generally by the different shades of those portions. In this example, portion 202B is the darkest shaded portion, and thus the densest data portion of data 202, while portions 202A and 202C are one step lighter shade and thus less dense than portion 202B, but denser than portion 202D. Data portion 202D is the lightest shade and least dense (or, most sparse) of the data portions in data block 202.

In one example, the density of a multidimensional data instance may be measured by the proportion of non-null entries in the various dimensions of the data, such as in an array, vector, matrix, or other multi-dimensional data format. Similarly, the sparsity of a multidimensional data instance may be measured by the proportion of null entries in the various dimensions of the data. By way of simple example, a data vector having entries [1, 0, 1] would have a density of ⅔ and a sparsity of ⅓. Generally, denser data requires more processing power, while sparser data requires less processing power.

Notably, the different densities and layout of the data portions (202A-D) in FIG. 2 are intended to be just one simple example for ease of explanation. Data may have significantly more complex density characteristics.

The processing order 203 of data 202 indicates that while processing data 202, different densities of data will be encountered at different times by processing cores 106A-D.

In this example, processing coordinator 104 divides data 202 into four sub-blocks 204A-D, which each include a subset of portions 202A-D as indicated by the matching shaded bands. As depicted in chart 206, processing data sub-blocks 204A-D by processing cores 106A-D in accordance with processing direction 203 results in a significant spike in total processing system power at 208, which corresponds with time segment 2 along the time axis. This is caused by each processing core (106A-D) reaching the higher density data portion 202B of data sub-blocks 204A-D simultaneously (or nearly so).

The power spike at 208 is an example of an undesirable power effect, which can cause various collateral issues for the processing system, such as a voltage droop on the processing system power bus, which may result in related degradations, such as processor frequency throttling, command stalling, system instability, and the like. Further, to mitigate the possibility of these issues, a higher operating voltage may be required, which increases power dissipation.

As described in more detail, below, the problem depicted in chart 206 may be overcome by determining data densities in data sub-blocks (e.g., in data sub-blocks 204A-D) and resequencing the data to avoid the concurrence of peak processing demands at each of the processing cores (e.g., 106A-D in this example).

Parallel Data Processing Architecture with Data Resequencing

Figure 3:
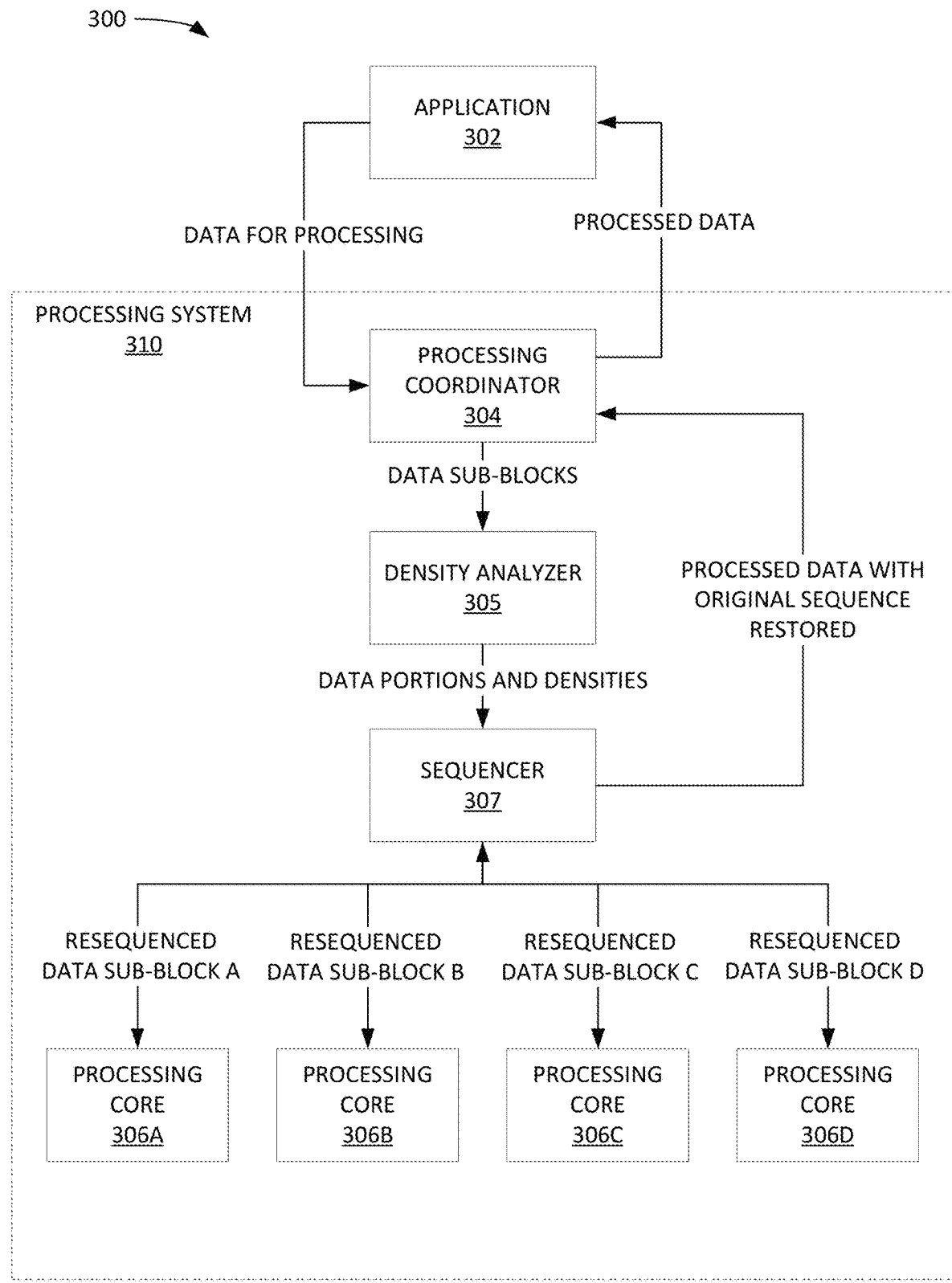
FIG. 3 depicts another example parallel data processing architecture.

FIG. 3 depicts another example parallel data processing architecture 300. In the depicted example, an application 302 provides data for processing to data processing system 310, which includes a data processing coordinator 304, data density analyzer 305, and data sequencer 307. Here again, application 302 may be referred to as a data processing requestor and may be local to or remote from the processing system 310.

As above, data processing coordinator 304 may generally be configured to coordinate parallel processing of data in a multi-processing unit data processing system, such as processing system 310. In this example, data processing coordinator 304 receives data from application 302 and generates data sub-blocks. As above, the received data may be a tensor.

In some examples, processing coordinator 304 may be implemented as part of a compiler configured to determine how to split and allocate data sub-blocks onto processing cores during a compile time. In other examples, processing coordinator 304 may be implemented as part of a task scheduler or kernel in an operating system configured to determine how to split and allocate data sub-blocks onto processing cores in run-time. Notably, these are just two example implementations, and others are possible.

Unlike the example in FIGS. 1 and 2, here the data sub-blocks are then analyzed by density analyzer 305 before processing. Density analyzer 305 is configured to determine densities (or, alternatively sparsities) of the incoming data sub-blocks. In some examples, the density determinations result in identifying a plurality of different data portions associated with different densities (or density ranges). In some examples, the data portions are arranged along the processing direction.

Density analyzer 305 provides the data sub-blocks and the determined densities to sequencer 307, which then resequences the individual data sub-blocks based on the determined densities in order to reduce or eliminate the coincidence of peak density data portions being processed by multiple processing cores at once.

In one example, sequencer 307 may generate resequenced data sub-blocks by changing (e.g., by shuffling or shifting) the order of the data portions (e.g., in processing order or time) in each sub-block to reduce concurrence of peak densities in the processing order of data portions across multiple processing units, such as processing cores 306A-D.

In another example, sequencer 307 may generate resequenced data sub-blocks by retrieving data from different density bins in a specific ordering. For example, sequencer 307 may resequences the data sub-blocks by drawing data from density bins in a circular order of data densities, as described in more detail with respect to FIG. 6. This likewise reduces the concurrence of peak densities in the processing order across multiple processing units, such as processing cores 306A-D.

Sequencer 307 may be configured not only to reduce coincidence of peak density data portions, but also to reduce the average difference in data density (or sparsity) between successive data portions (e.g., along the processing order). In one example, this may be performed by resequencing the various data portions in an increasing or decreasing density order such that the density of data portion $x_i$ is $x_{i-1} < x_i < x_{i+1}$ or $x_{i-1} > x_i > x_{i+1}$. This density-based (or sparsity) ordering beneficially reduces the size of processing power changes (e.g., in current draw) between data portions of varying density.

Figure 4:
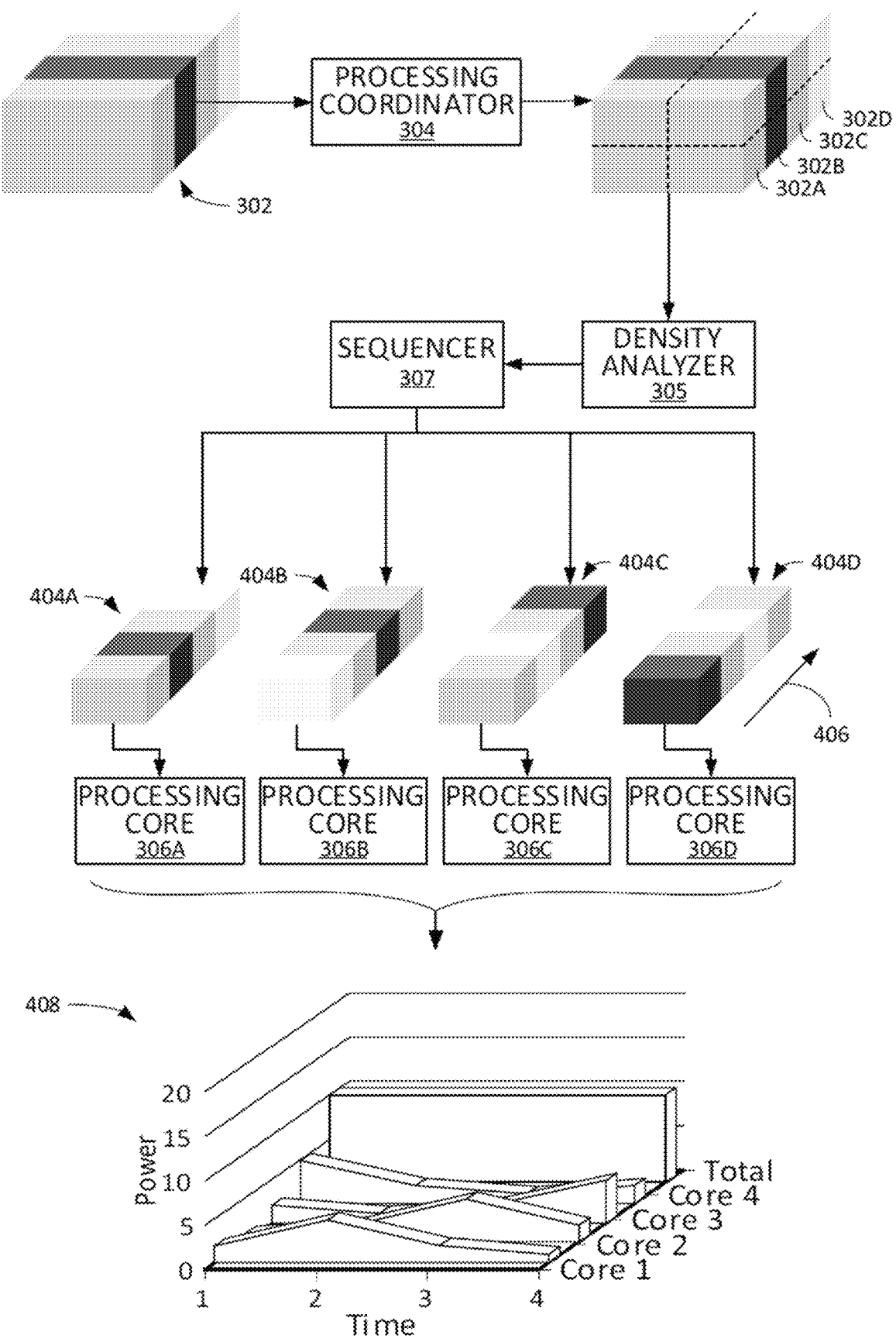
FIG. 4 depicts an example of dynamic resequencing of data for parallel processing to reduce power effects.

In the depicted embodiment, sequencer 307 provides resequenced data sub-blocks to processing cores 306A-D, respectively, which is further depicted and described with respect to FIG. 4. As further defined with respect to FIG. 6, in other examples, each processing core (e.g., 306A-D) may be assigned a default density-based order and configured to read the data portions based on the default density-based order.

In some examples, after processing, sequencer 307 may receive the processed data and resequence it to match the original sequence order. In this way, the density determination and sequencing can be implemented without affecting an existing parallel data processing coordination function. However, in other examples, processing cores 306A-D may provide the processed data directly to processing coordinator 304 if the sequence of the data processing results is not important to the overall data processing result.

Examples of density analyzer (305) and/or sequencer (307) can be implemented as a form of hardware logic and/or software logic. For example, in some examples, as described in more detail below with respect to FIG. 8, density analyzer (305) and sequencer (307) are implemented as a part of DMA, which includes hardware logic and low level firmware.

Though shown as separate aspects in this example, in alternative examples, the functions of density analyzer 305 and sequencer 307 may be consolidated in a single element, such as in processing coordinator 304, or in another aspect of processing system 310. These various functions are shown independently in FIG. 3 for clarity.

Example of Dynamic Resequencing of Data for Parallel Processing

FIG. 4 depicts an example of dynamic resequencing of data for parallel processing to reduce power effects.

In the depicted example, multidimensional data block 302 is provided by an application, such as described above in FIG. 3, for parallel data processing. Here again, data block 302 has portions (e.g., 302A-D) of varying data density (or sparsity). In this example, portion 302B is the darkest shaded portion, and thus the densest data portion, while portions 302A and 302C are one step lighter in shade and thus less dense than portion 302B, but denser than portion 302D. Data portion 302D is the lightest shade and least dense (or, most sparse) of the data portions in data block 302.

Notably, in this example, the density of each portion 302A-D is uniform, but in other examples, the density across one or more dimensions of multidimensional data block 302 may not be uniform. For example, data block 302 may represent image data and each of data portions 302A-D may represent a different channel (or layer) of the image with its own measurable density. As above, densities can be measured by the number of null or zero entries in a portion of the data, such as a slice of image data having dimensions width (w)×height (h)×depth (d).

Data processing coordinator 304 receives data block 302 and generates a plurality of data sub-blocks for parallel processing, which are then provided to density analyzer 305. Density analyzer 305 analyzes the data sub-blocks and, for example, identifies portions of the data sub-blocks of varying density. In one example, the portions may correspond with a plurality of predetermined density ranges.

Density analyzer 305 then provides the data sub-blocks and density data to sequencer 307, which resequences the data sub-blocks dynamically based on the determined density data.

In the example depicted in FIG. 4, the original, relative order of data portions (302A-D) is maintained in resequenced data sub-blocks 404A-D when considered in a circular fashion, but the processing time of each data portion is shifted in each data sub-block by the resequencing. In particular, in this example, the processing order of the data portions in data sub-block 404A is as in original data block 302 while the processing order of data portions in each subsequent data sub-block is incremented by one position, or in other words, by one position for data sub-block 404B, two positions for data sub-block 404C, and three positions for data sub-block 404D. As depicted, when a data portion reaches the end of the sub-block, its next increment is back to the beginning position in circular fashion. This resequencing of data portions along the processing order of a data sub-block may be referred to generally as process time resequencing. Process time resequencing may have a defined stride that defines how many positions to shift a particular portion. In the depicted example, the stride is 1.

The beneficial result of the process time resequencing in FIG. 4 is that the resequenced data sub-blocks 404A-D have data portions of varying densities in different time segments of the processing order 406. The distribution of the peak density data portions (and thus peak processing power) across different time segments for the different data sub-blocks beneficially reduces the peak total processing system power as compared to chart 206 in FIG. 2. In particular, the process time resequencing in this example results in the densest data portion being processed in the second time segment for data sub-block 404A, in the third time segment for data sub-block 404B, in the fourth time segment for data sub-block 404C, and in the first time segment in data sub-block 404D (having been rotated back to the first segment of the processing order). Further, the total system processing power over time segments 1-4 stays consistent in chart 408 as compared to having a significant peak in chart 206 of FIG. 2.

Figure 6:
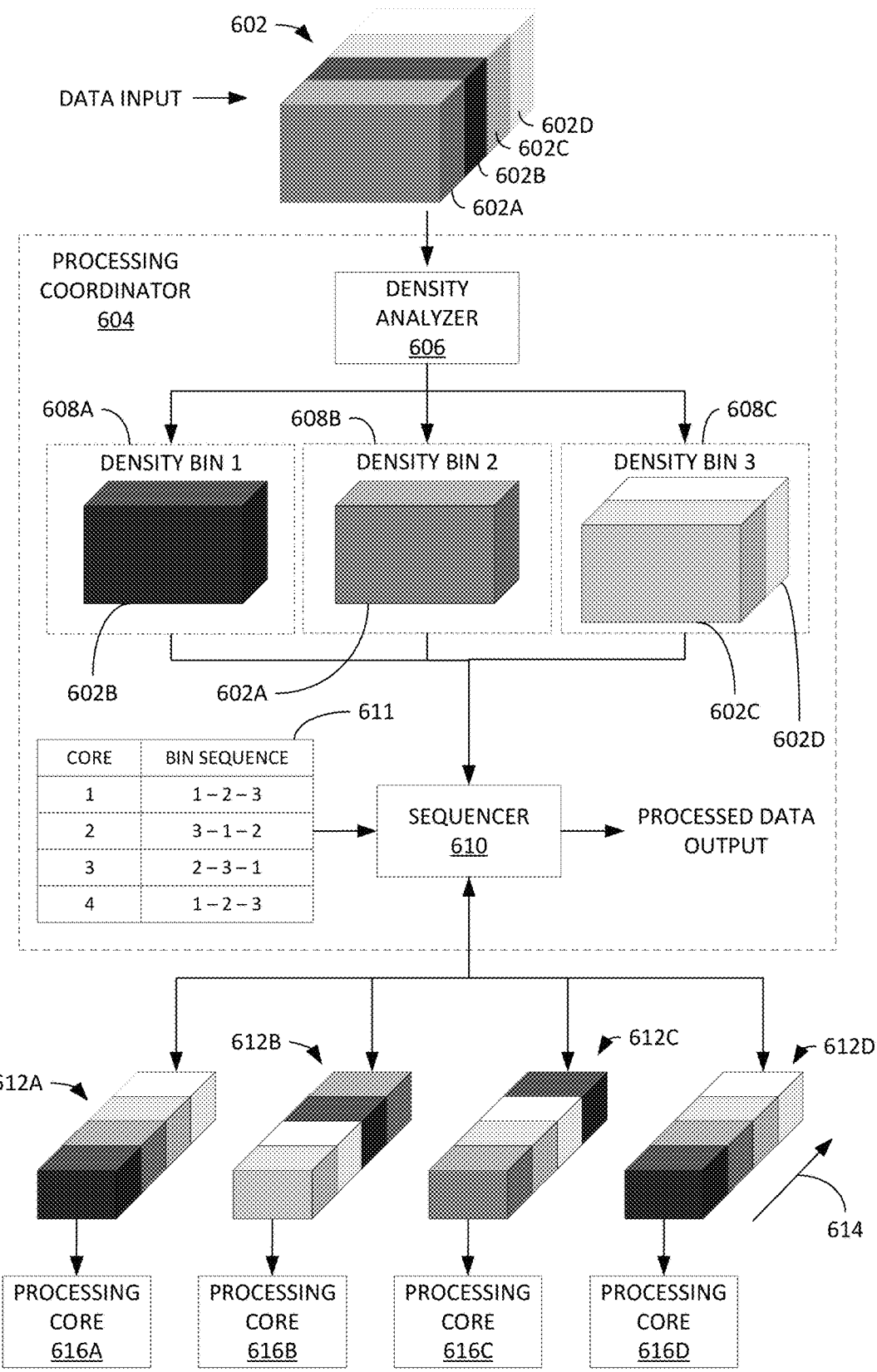
FIG. 6 depicts another example of dynamic resequencing of data for parallel processing to reduce power effects.

More generally, the process time resequencing generates a plurality of processing orders for the different data portions in data sub-blocks 404A-D. In this example, each data sub-block 404A-D has a different processing order for the data portions, but in other examples there may be more sub-blocks than data portions per sub-block, in which case certain processing orders may be repeated (such as depicted in FIG. 6).

Notably, while the number of data portions is the same as the number of data sub-blocks in this example, this need not be the case and is used in this example for ease of explanation. Further yet, while in this example the number of data sub-blocks (404A-D) matches the number of processing cores (306A-D), this also need not be the case. In some processing systems, the number of available cores may be dynamic, and this process may be performed according to the dynamically available processing resources.

Though not depicted in FIG. 4, in others examples, the data portions of sub-blocks 404A-D may be further resequenced according to decreasing or increasing density order. In other words, a first data sub-block may be resequenced such that the first data portion (at the beginning of the processing order) has the highest density and each subsequent data portion has a lower density than the preceding data portion, i.e., in order of decreasing density. The subsequent data sub-blocks may then be time resequenced as described above. Alternatively, a first data sub-block may be resequenced such that the first data portion has the lowest density and each subsequent data portion has a higher density than the preceding data portion, i.e., in order of increasing density. This may be referred to generally as density order resequencing and may beneficially reduce the change in density between adjacent data portions and thus the change in processing power. Once a first data sub-block has its data portions ordered by density, then process time sequencing may be applied as described above.

Example Method of Dynamic Resequencing of Data for Parallel Processing

Figure 5:
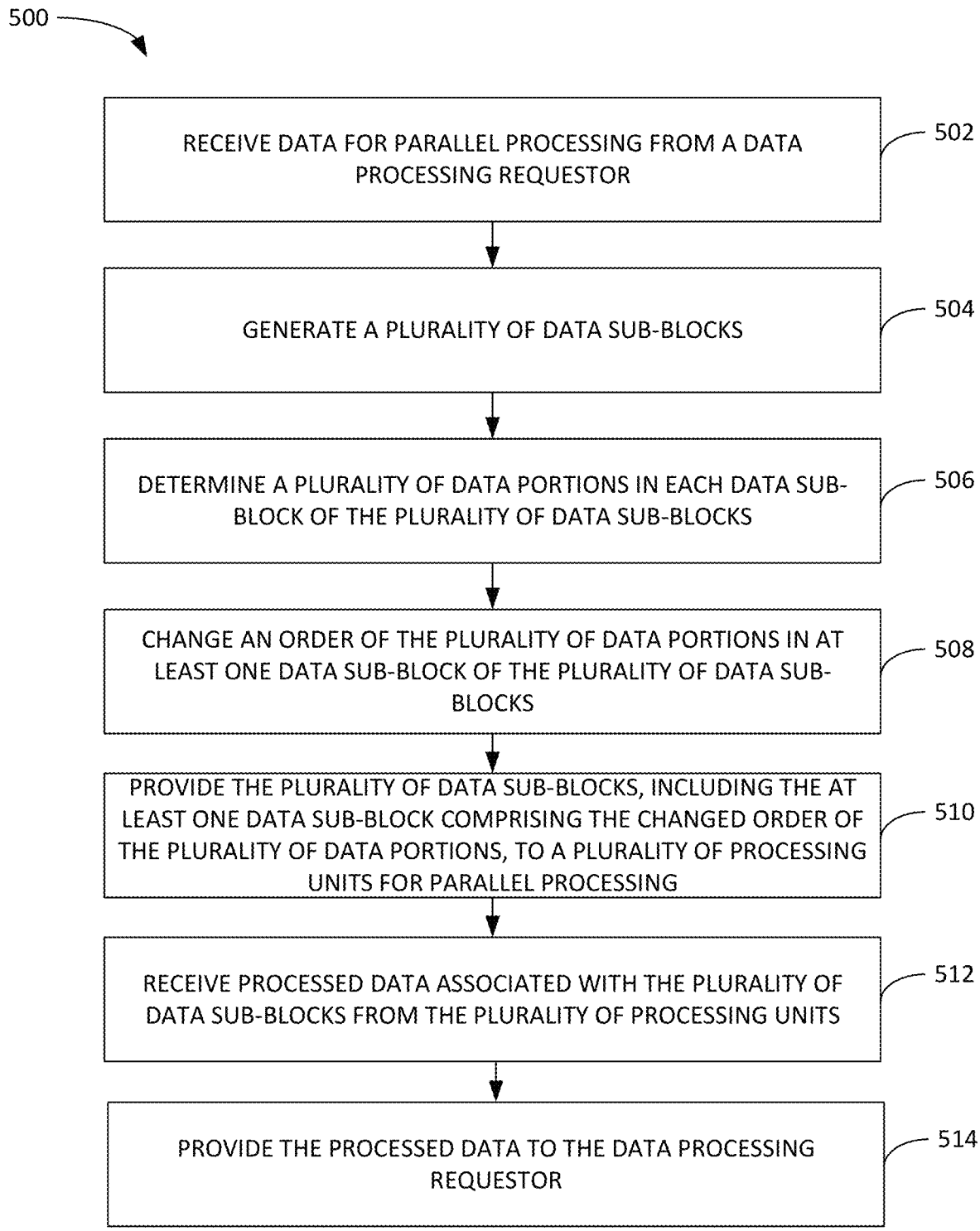
FIG. 5 depicts an example method of dynamically resequencing data for parallel processing.

FIG. 5 depicts an example method 500 of dynamically resequencing data for parallel processing. Method 500 may be performed, for example, by a processing system, such as processing system 310 of FIG. 3 and 804 of FIG. 8. As further described herein, in some embodiments, aspects of method 500 may be performed by a DMA controller, as described with respect to FIG. 8.

Method 500 begins at step 502 with receiving data for parallel processing from a data processing requestor, such as described with respect to FIGS. 3, 4, and 6. In various embodiments, a data processing requestor may be a local application, a remote application, a local processing subsystem (such as another processor in the same processing system), a local or remote process, or the like.

Method 500 then proceeds to step 504 with generating a plurality of data sub-blocks, such as described with respect to FIGS. 3, 4, and 6. As above, in some aspects, each data sub-block represents a subset of the data to be processed in the same manner, while in other aspects, each sub-block is a duplicate set of the data to be processed in different manners.

Method 500 then proceeds to step 506 with determining a plurality of data portions in each data sub-block of the plurality of data sub-blocks. As above, the data portions may be determined with reference to a plurality of densities or density ranges, such as by binning according to density.

In some aspects, determining a plurality of data portions in each data sub-block of the plurality of data sub-blocks includes: determining a plurality of density ranges, wherein each density range of the plurality of density ranges is distinct from each other density range of the plurality of density ranges; and determining the plurality of data portions based on the plurality of density ranges.

Method 500 then proceeds to step 508 with changing (or resequencing) an order of the plurality of data portions in at least one data sub-block of the plurality of data sub-blocks. In this example, changing the order of data portions in a data sub-blocks forms a resequenced data sub-block.

In some aspects, changing the order of the plurality of data portions for the at least one data sub-block of the plurality of data sub-blocks includes: time-shifting each data portion of the plurality of data portions along a processing time direction in a circular order, such as described with respect to FIGS. 4 and 6.

In some aspects, changing the order of the plurality of data portions for the at least one data sub-block of the plurality of data sub-blocks comprises: arranging the plurality of data portions according to one of an increasing density order or a decreasing density order, such as described with respect to FIGS. 4 and 6.

Method 500 then proceeds to step 510 with providing the plurality of data sub-blocks, including the at least one data sub-block comprising the changed order of the plurality of data portions, to a plurality of processing units for parallel processing.

Method 500 then proceeds to step 512 with receiving processed data associated with the plurality of data sub-blocks from the plurality of processing units.

Method 500 then proceeds to step 514 with providing the processed data to the data processing requestor.

In some aspects, method 500 further includes changing an order of the processed data associated with the plurality of data sub-blocks based on an original order of the plurality of data portions in each data sub-block of the plurality of data sub-blocks prior to providing the processed data to the data processing requestor.

In some aspects, method 500 further includes changing an order of the plurality of data portions in each data sub-block of the plurality of data sub-blocks.

Figure 8:
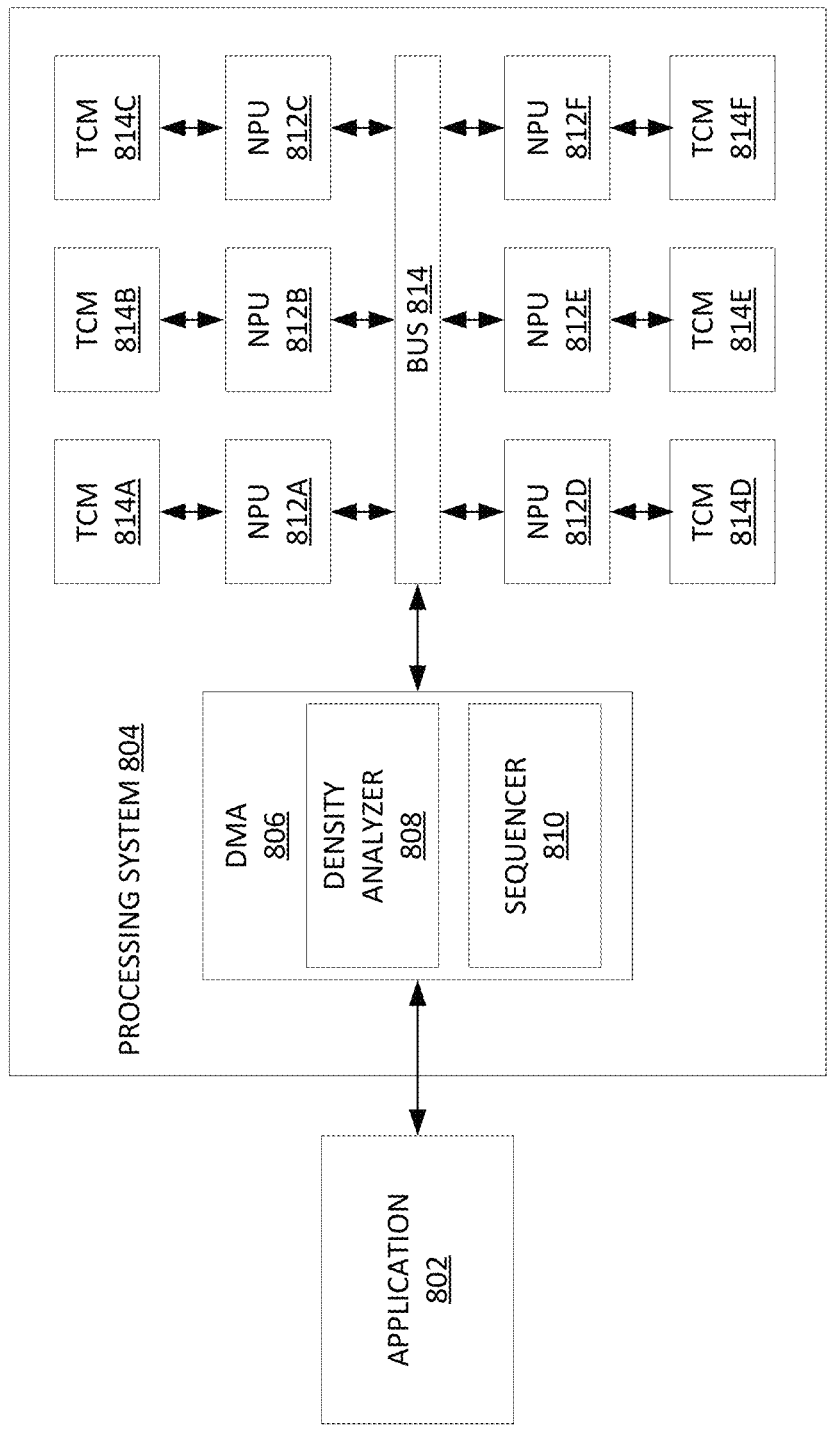
FIG. 8 depicts an example processing system configured to preform parallel processing using density-based resequencing.

In some aspects, determining the plurality of data portions in each data sub-block of the plurality of data sub-blocks is performed by a Direct Memory Access (DMA) controller in data communication with the plurality of processing units, such as described with respect to FIG. 8.

In some aspects, changing the order of the plurality of data portions in the at least one data sub-block of the plurality of data sub-blocks is performed by the DMA controller, such as described with respect to FIG. 8.

In some aspects, the data for parallel processing comprises machine learning data associated with a machine learning model.

Figure 16:
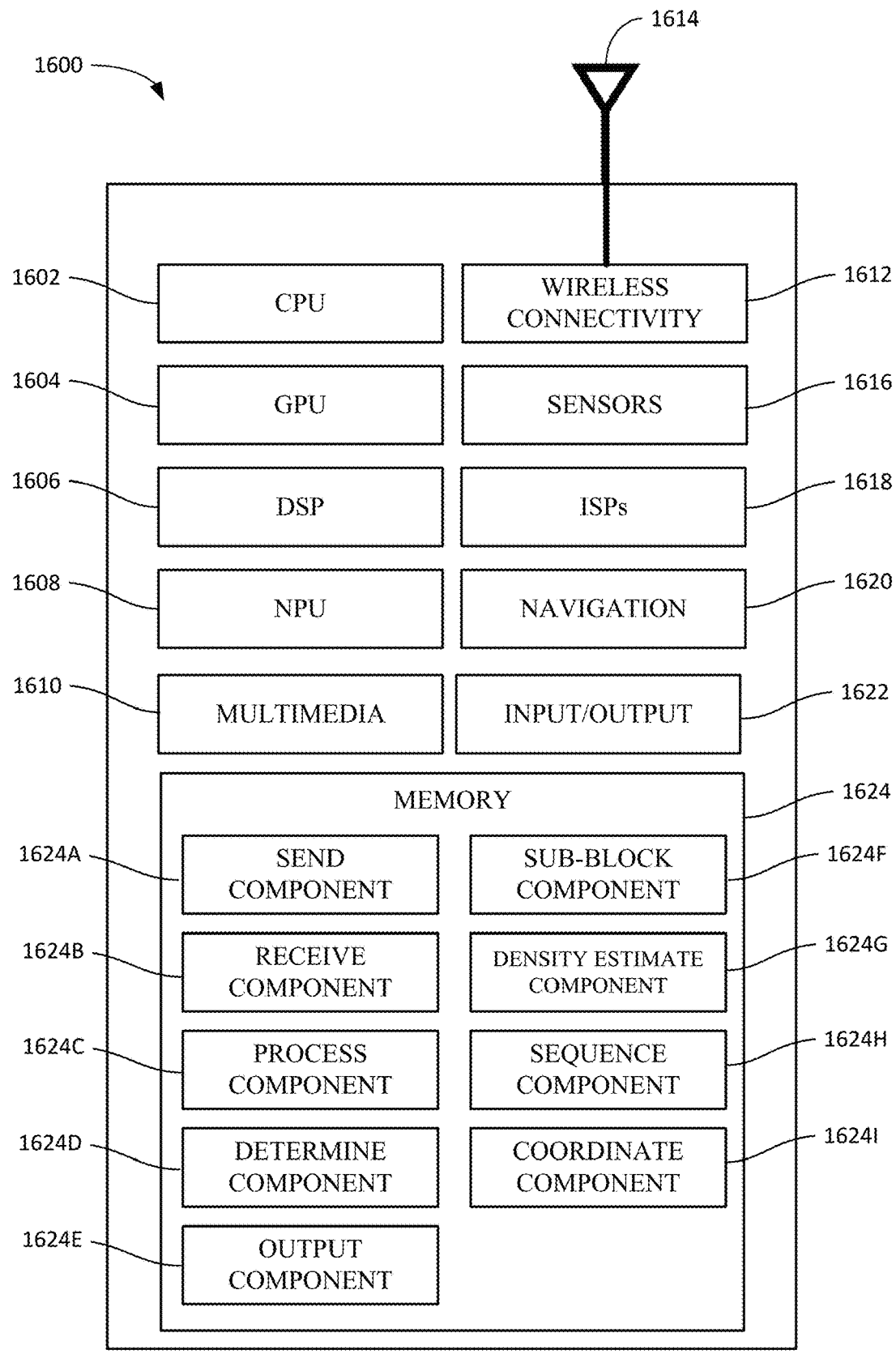
FIG. 16 depicts an example electronic device that may be configured to perform the methods described herein.

In some aspects, the plurality of processing units comprise at least one neural signal processing unit or AI acceleration unit, such as described with respect to FIG. 16.

In some aspects, method 500 may be used to perform neural network convolution processing across many neural signal processing units (NPUs) (or AI acceleration cores). Similarly, method 500 may be used to perform neural network convolution processing across many arithmetic logic units (ALUs) inside a GPU, or many GPUs or across many CPUs. For example, method 500 may be used to perform general image processing across many ALUs inside a GPU, or many GPUs.

Example of Dynamic Resequencing of Data for Parallel Processing Based on Density Binning FIG. 6 depicts another example of dynamic resequencing of data for parallel processing to reduce power effects.

In particular, FIG. 6 depicts a processing coordinator 604, which includes a density analyzer 606 and a sequencer 610. In this example, processing coordinator 604 receives a multidimensional data block 602, which in some aspects may be a tensor. Processing coordinator 604 then uses density analyzer 606 to examine data block 602.

Density analyzer 606 identifies portions of data block 602 having densities within predefined ranges associated with density bins 608A-C. Density analyzer 606 then places the identified portions of data block 602, including 602A-D, into bins 608A-C based on the determined densities. Generally, the plurality of density bins will cover the entire range of possible densities so that all data portions can be assigned to a unique bin.

As depicted in this example, data portion 602B is the highest density data portion and is stored in bin 608A based on its determined density falling in a density range associated with bin 608A (e.g., density>66%); data portion 602A is an intermediate density data portion and is stored in bin 608B based on its determined density falling in a density range associated with bin 608B (e.g., 33%<density<66%); and data portions 602C and 602D are low density data portions stored in bin 608C based on their determined densities falling in a density range associated with bin 608C (e.g., density<33%).

In this example, sequencer 610 then generates resequenced data sub-blocks 612A-D by drawing data portions from density bins (608A-C) in a defined order, which is modified (e.g., incremented) for each data sub-block.

In the depicted example, a density bin sequence map 611 is used by sequencer 610 to map each processing core to a bin sequence (or order) in a circular fashion. For example, core 1 (616A) is mapped to sequence 1-2-3 (i.e., bins 608A-608B-608C), core 2 (616B) is mapped to sequence 3-1-2 (i.e., bins 608C-608A-608B), and so on. In this example, the bin sequences are each incremented by one bin for each successive processing core in a circular order. Further, in this example, the sequence repeats by the fourth processing core because there are only three bins. In other aspects, there may be more or fewer bins and more or fewer processing cores.

In other examples, processing cores 616A-D may be configured to read data portions from densities bins 608A-C in a predetermined bin sequence order (such as shown in 611) without the need for action by sequencer 610. In such examples, the predetermined density bin ordering assignments may be configured at installation time in, for example, a processing core firmware image.

After processing by processing cores 616A-D, the processed data may be resequenced and recombined to form processed data output. In some examples, the bin sequence map may be used to resequence the processed data to match the original sequence of the data input. In this way, the data processing requestor need not be modified to receive the processed data.

Figure 7:
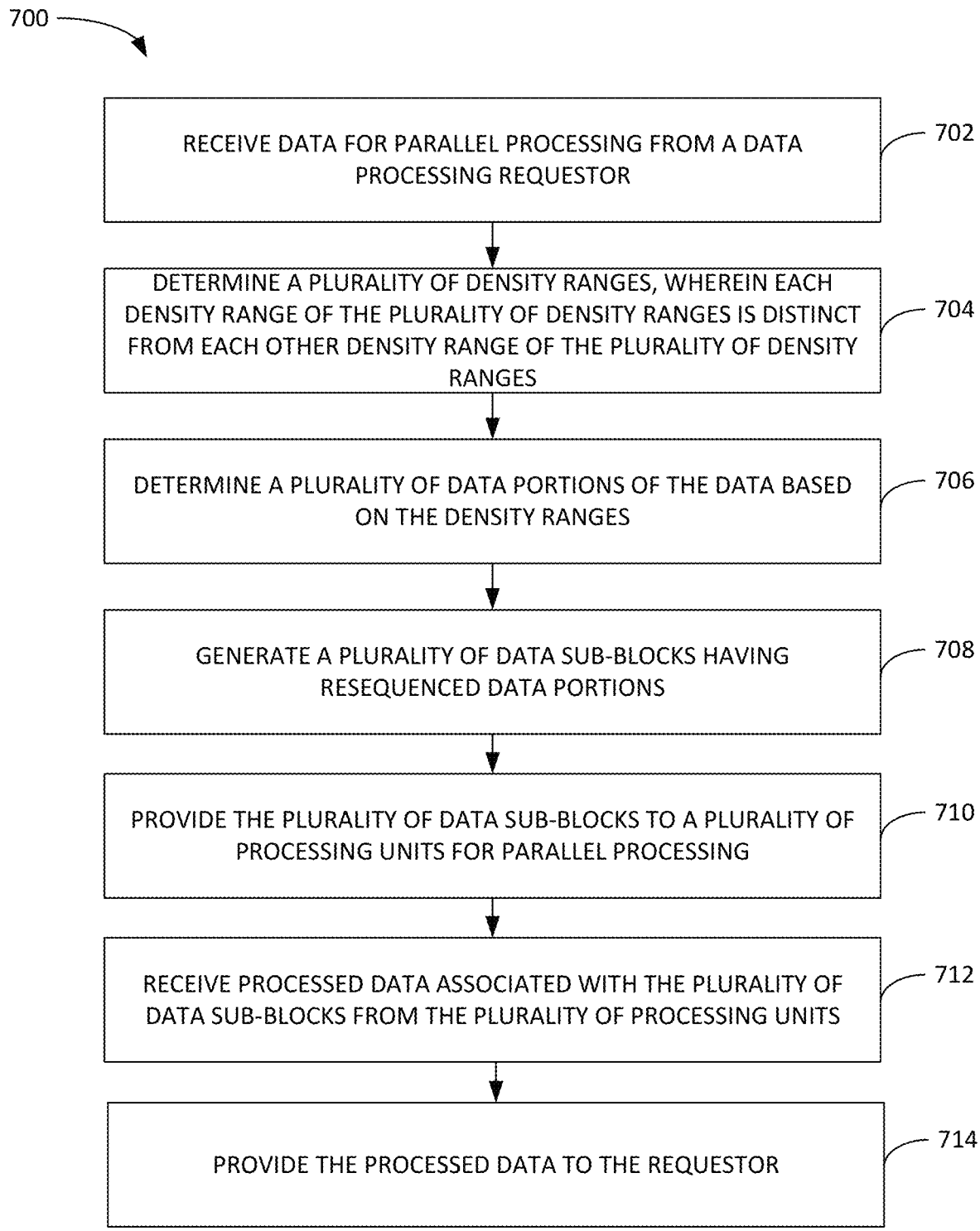
FIG. 7 depicts an example method of dynamically resequencing data for parallel processing using density binning.

Example Method of Dynamic Resequencing of Data for Parallel Processing Using Density Binning FIG. 7 depicts an example method 700 of dynamically resequencing data for parallel processing using density binning.

Method 700 begins at step 702 with receiving data for parallel processing from a data processing requestor.

Method 700 then proceeds to step 704 with determining a plurality of density ranges, wherein each density range of the plurality of density ranges is distinct from each other density range of the plurality of density ranges.

Method 700 then proceeds to step 706 with determining a plurality of data portions of the data based on the density ranges.

In some aspects, determining the plurality of data portions of the data based on the density ranges comprises: determining a density for each respective data portion of the plurality of data portions; and assigning each respective data portion of the plurality of data portions to one density bin of a plurality of density bins based on the determined density for the respective data portion, wherein each density bin is associated with one density range of the plurality of density ranges, such as described above with respect to FIG. 6.

In some aspects, determining the plurality of data portions of the data based on the density ranges is performed by a Direct Memory Access (DMA) controller in data communication with the plurality of processing units, such as described with respect to FIG. 8. A benefit of having the density (or sparsity) calculation in the DMA is that it hides the associated computational latency, which can be done in parallel with moving and buffering the data for each data portion.

Method 700 then proceeds to step 708 with generating a plurality of data sub-blocks having resequenced data portions.

In some aspects, generating the plurality of data sub-blocks having resequenced data portions comprises: adding data portions to the plurality of data sub-blocks according to a plurality of bin sequences, wherein each bin sequence of the plurality of bin sequences comprises a unique sequence of the plurality of density bins, such as described with respect to FIG. 6.

In some aspects, generating the plurality of data sub-blocks having resequenced data portions is performed by the DMA controller, such as described with respect to FIG. 8.

Method 700 then proceeds to step 710 with providing the plurality of data sub-blocks to a plurality of processing units for parallel processing.

In some aspects, providing the plurality of data sub-blocks to the plurality of processing units for parallel processing is performed by the DMA controller, such as described with respect to FIG. 8.

Method 700 then proceeds to step 712 with receiving processed data associated with the plurality of data sub-blocks from the plurality of processing units.

In some aspects, receiving the processed data associated with the plurality of data sub-blocks from the plurality of processing units is performed by the DMA controller, such as described with respect to FIG. 8.

Method 700 then proceeds to step 714 with providing the processed data to the data processing requestor. In various embodiments, a data processing requestor may be a local application (such as described with respect to FIGS. 3 and 6), a remote application, a local processing subsystem (such as another processor in the same processing system), a local or remote process, or the like.

In some aspects, method 700 further comprises assigning each bin sequence of the plurality of bin sequences to one or more processing units of the plurality of processing units, wherein each respective data sub-block of the plurality of data sub-blocks is provided to one processing unit of the plurality of processing units based on the respective data sub-block's assigned bin sequence.

In some aspects, method 700 further comprises determining the plurality of bin sequences according to one of an increasing density order or a decreasing density order; and a processing order time shift.

In some aspects, the data for parallel processing is machine learning model input data for a convolutional neural network model.

In some aspects, each data portion of the plurality of data portions comprises a feature map. In some embodiments, a feature map may represent the output of one filter applied to a previous layer of a neural network, such as a convolutional neural network. In some cases, features maps may be referred to as intermediate feature maps, which may be representative of outputs from intermediate layers in a deep neural network, such as a convolutional neural network.

Figure 15:
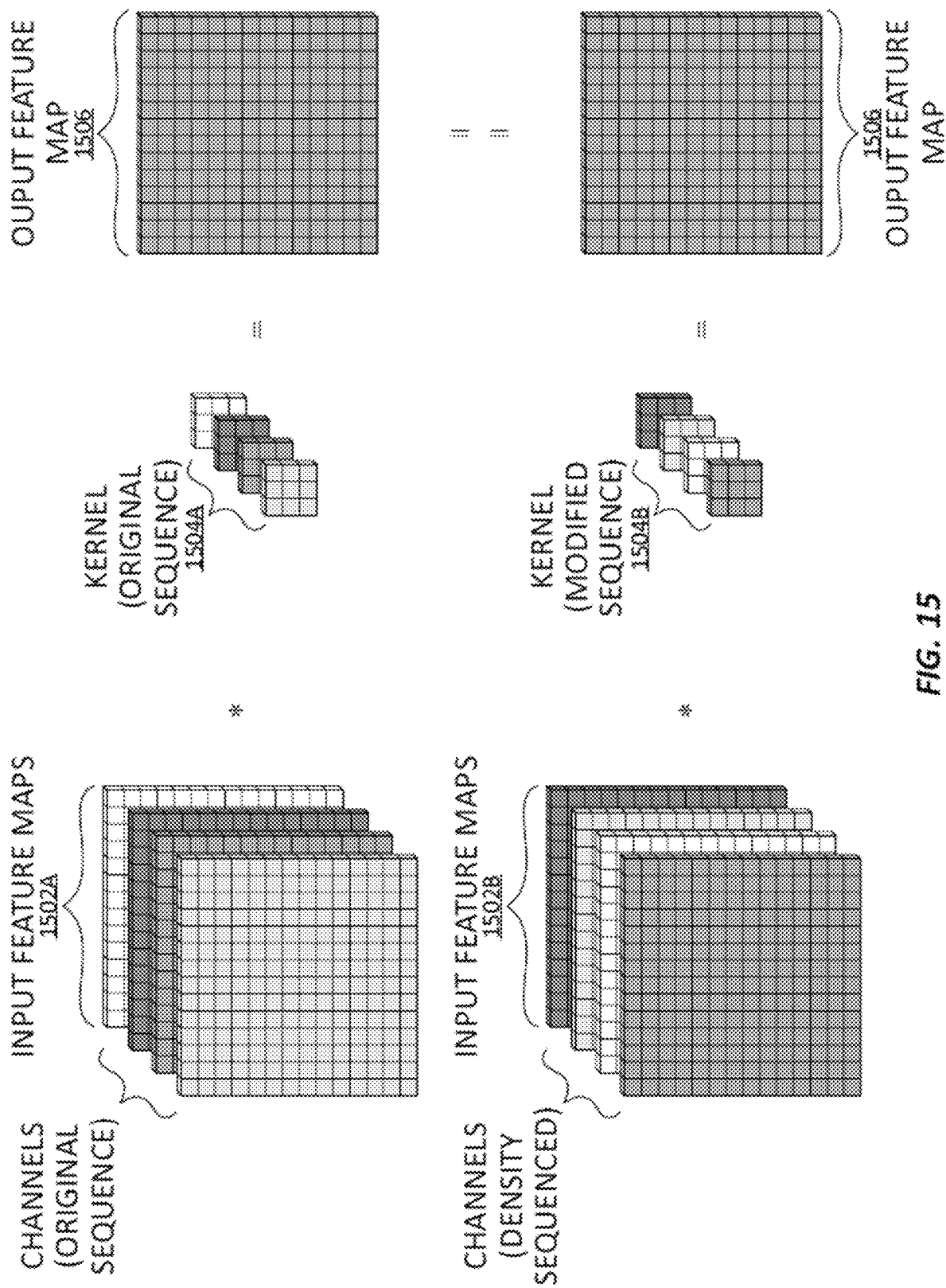
FIG. 15 depicts a useful property of certain machine learning operations when using density resequenced input data.

In some aspects, method 700 further comprises resequencing a convolutional kernel (or filter) for each respective data sub-block of the plurality of data sub-blocks based on a sequence of data portions in the respective data sub-block; and applying the resequenced convolutional kernel to the respective data sub-block, such as described with respect to FIG. 15. In various embodiments, a convolutional kernel or filter is a set of trainable values or parameters that are applied to data being processed by layers of a convolutional neural network model to generate layer output data, such as a feature map. Convolutional kernels, such as depicted in FIG. 15, may comprise multiple layers, which can be resequenced to match resequenced input data, such as resequenced input feature maps.

In some aspects, the plurality of processing units comprise at least one neural signal processing unit or AI acceleration unit, such as described with respect to FIG. 16.

In some aspects, method 700 may be used to perform neural network convolution processing across many neural signal processing units (NPUs) (or AI acceleration cores). Similarly, method 700 may be used to perform neural network convolution processing across many arithmetic logic units (ALUs) inside a GPU, or many GPUs or across many CPUs. For example, method 700 may be used to perform general image processing across many ALUs inside a GPU, or many GPUs.

Example System for Parallel Processing Using Density-Based Resequencing

FIG. 8 depicts an example processing system 804 configured to perform parallel processing using density-based resequencing, as discussed herein.

In this example, processing system 804 receives data from application 802 to be parallel processed using a plurality of processing units, which include neural signal processing units (NPUs) 812A-F, as described in further detail below, which may alternatively be referred to as AI acceleration cores or units. Notably, in other examples, other numbers and/or types of processing units may be used in addition to or instead of NPUs 812A-F, such as the various types of processing units described below with respect to FIG. 16.

The data from application 802 is received by direct memory access (DMA) controller 806, which in this example includes density analyzer 808 and sequencer 810, such as those described above. Notably, in other examples, one or more of density analyzer 808 and sequencer 810 may be separate from DMA controller 806. Further, as above in FIG. 6, density analyzer 808 and sequencer 810 may be a part of a processing coordinator (not shown). Alternatively, a separate processing coordinator may be provided and function as described herein.

In other examples, each NPU may be assigned a default density bin read order that can be followed for each sub-block, thus obviating the need for sequencer 810 to perform that function. The density bin ordering assignment can be defined, for example, at installation time in, for example, a NPU firmware image. However, sequencer 810 may be used to override the default ordering in some embodiments.

In this example, DMA controller 806 performs the density analysis and resequencing functions (as described above) and provides resequenced data sub-blocks (not shown) to one or more of NPUs 812A-F for parallel processing. The resequenced data sub-blocks may be stored, for example, in memories associated with each of the NPUs, such as tightly coupled memories (TCMs) 814A-F. Generally, TCMs provide low-latency memory that a processor can use without the unpredictability characteristic for caches. A TCM can be used, for example, to hold critical routines, such as interrupt handling routines or real-time tasks where the indeterminacy of a cache is undesirable.

In one examples, processing system 804 may be configured to perform neural network convolution processing across NPUs 812A-F.

Notably, FIG. 8 is just one example of certain aspects of a processing system, and other aspects may be present and other configurations are possible.

Example Parallel Processing of Neural Network Data Using Density Based Resequencing Parallel processing of machine learning data, such as for neural networks, is demanding on processing systems. Many factors may lead to increased peak current draws as well as increased current ramps over short periods of time, which are detrimental to processing system performance as described above. For example, processing systems for machine learning data may generally operate at high frequencies in order to quickly process the various instructions and threads associated with machine learning operations. Further, machine learning data may generally be dense.

Figure 9:
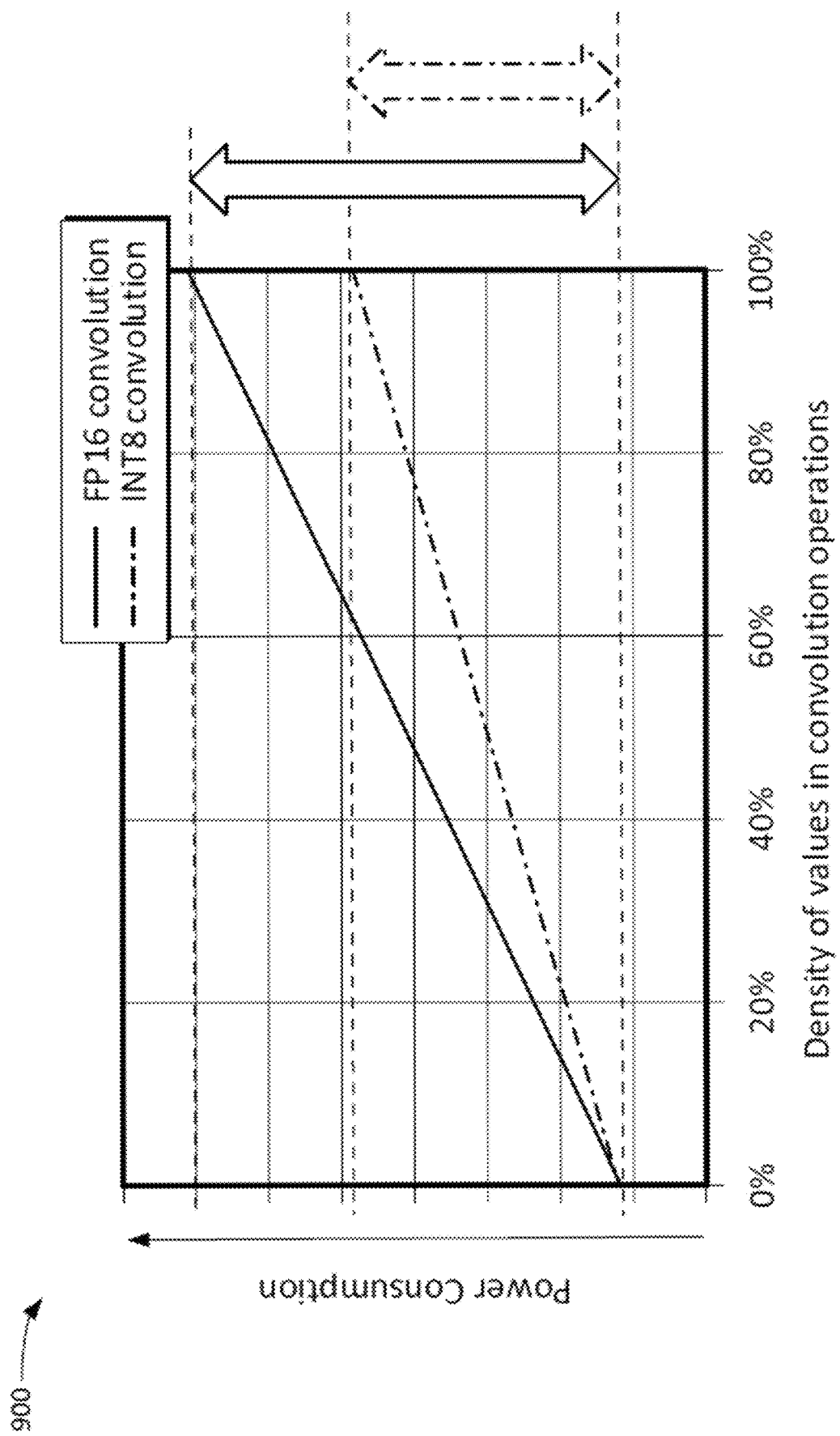
FIG. 9 depicts a chart depicting an example relationship between density in convolutional neural network data and the power consumption of a processing unit.

To illustrate the impact of dense machine learning data on processing power, FIG. 9 depicts a chart 900 depicting an example relationship between density in convolutional neural network data and the power consumption of a processing unit. As depicted, the amount of processing power used generally increases as the density of convolutional neural network data increases (i.e., as the sparsity decreases). Further, the increase in power consumption as the density increases is further increased as the data size and computational complexity is increased (e.g., floating point multiply accumulates consume more power than integer multiply accumulates). In this particular example, 16-bit floating point convolution data processing consumes 40% more power as compared to 8-bit integer convolution data processing at full density, such as in a saturated tensor.

Figure 10:
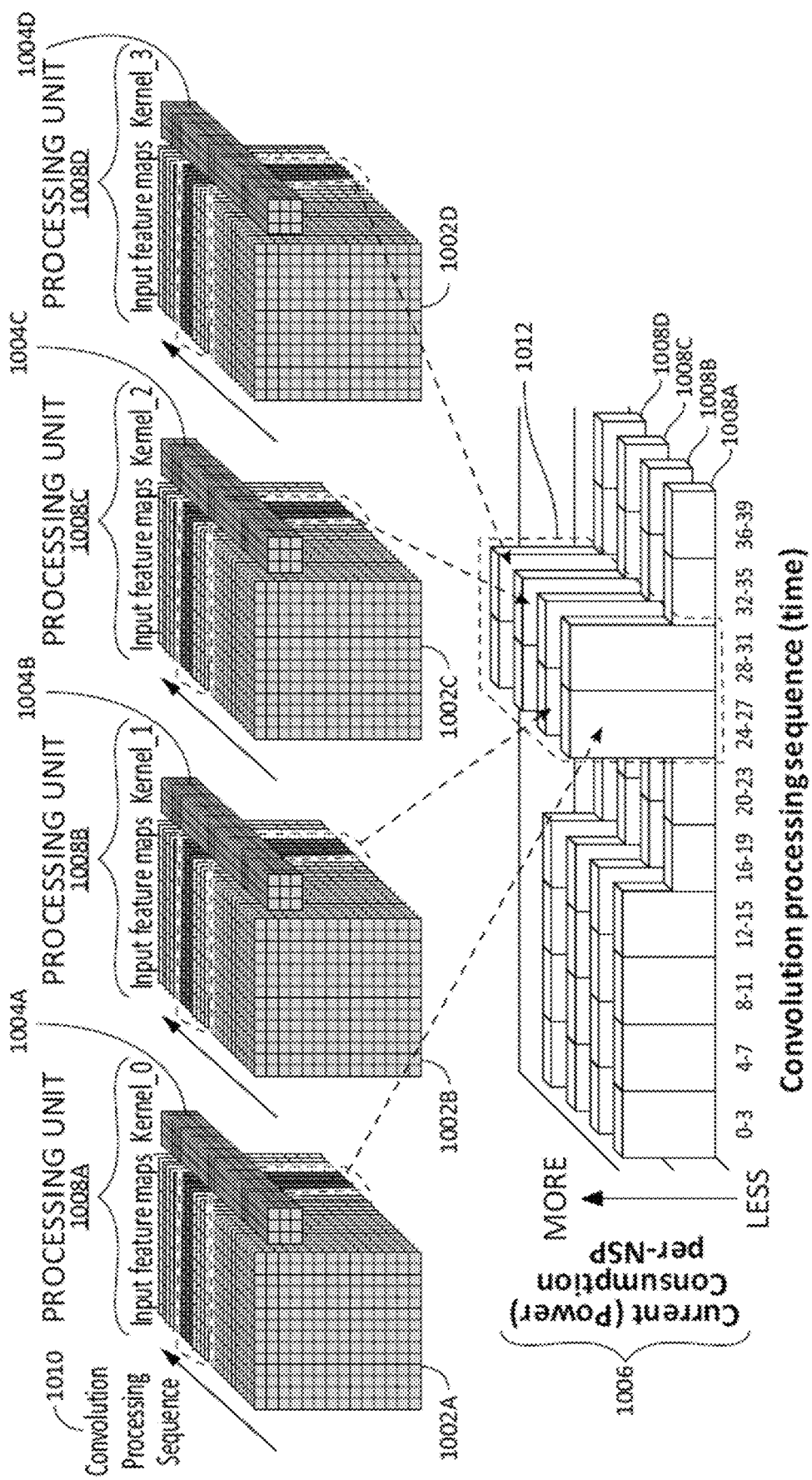
FIG. 10 depicts an example of parallel processing multi-dimensional data blocks.

FIG. 10 depicts an example of parallel processing multi-dimensional data sub-blocks 1002A-D. In this example, each data sub-block 1002A-D comprises a plurality of feature maps, which are processed with convolutional kernels 1004A-D (e.g., in a convolutional layer of a neural network). In this example, the density of data sub-blocks 1002A-D varies along the various feature maps in each data sub-block as depicted by the different shades of feature maps along the convolution processing sequence 1010 of each sub-block, thus each feature map in this example may be considered a portion of its respective data sub-block.

Chart 1006 depicts the power consumption of four processing units 1008A-D. Because data sub-blocks 1002A-D each have denser portions (e.g., feature maps) at the same locations along the convolution processing sequence 1010 of the data sub-blocks, the power consumption of each processing unit 1008A-D is highest at the same time, thus causing a large increase in overall processing power, as depicted at 1012. As described above, this large increase is detrimental to system performance because it may cause disruptive power effects, such as voltage droop (as described in more detail with respect to FIGS. 11A-C), which may then affect other parts of the system, such as by causing throttling of processing operations.

Figure 11A:
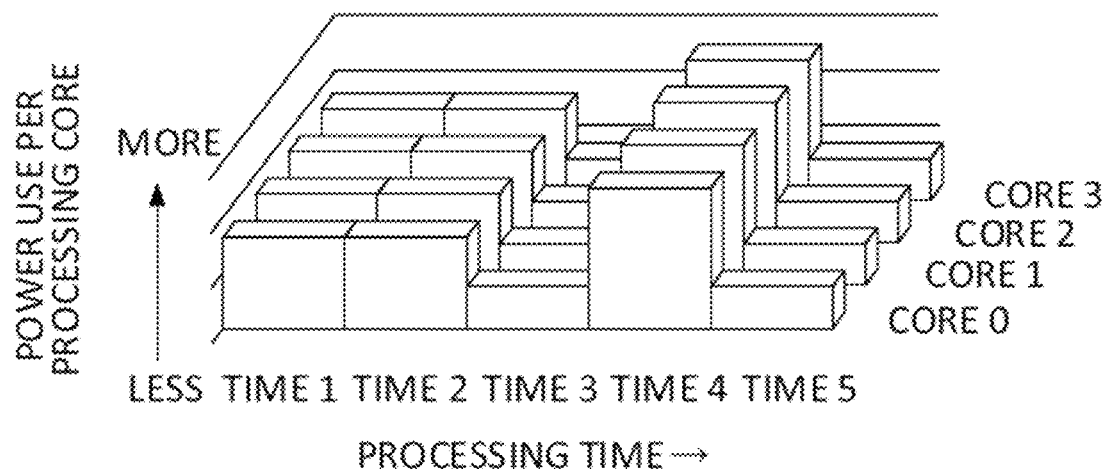
FIGS. 11A-C depict example power effects associated with parallel processing.

FIG. 11A depicts an example chart of power consumption for a plurality of processing cores, similar to the chart 1006 in FIG. 10.

Figure 11B:
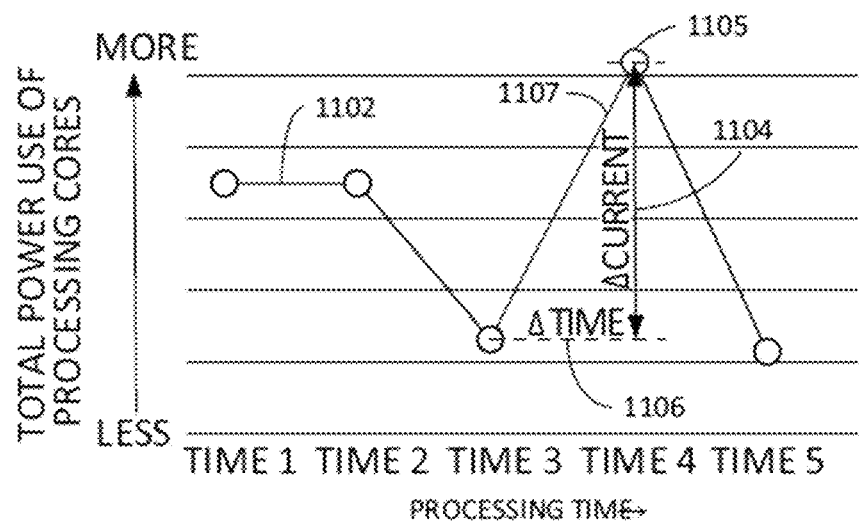

FIG. 11B depicts an example of the total processing power consumption 1102 of cores 0-3 from FIG. 11A. As depicted, the total processing power generally varies over time, but reaches a maximum in a power spike at 1105, which corresponds with time increment 4 in FIG. 11A. Further, the change in current 1104 (e.g., Δi) over the change in time 1106 (e.g., Δt) results in a steep ramp 1107 (e.g., Δi/Δt) of power consumption. This sudden change in power consumption, which causes a sudden change in current, may cause disruptive power effects, such as the voltage droop depicted in FIG. 11C.

Figure 11C:
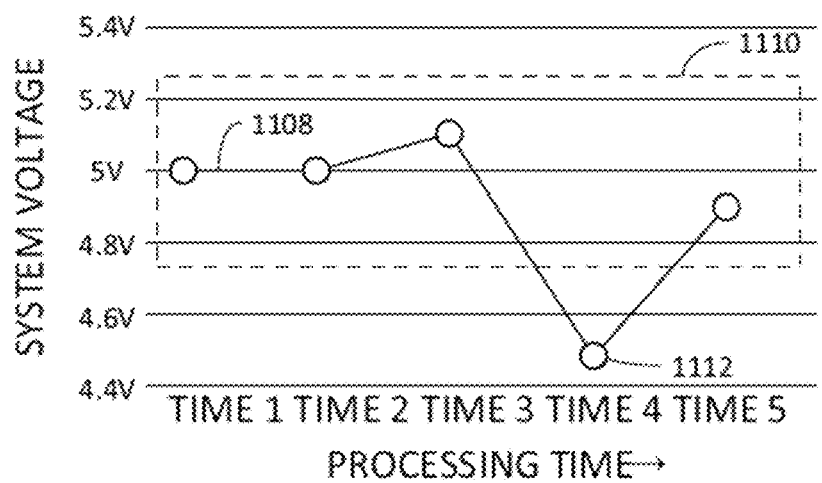

FIG. 11C depicts an example of system voltage 1008 over time, which corresponds in time with FIGS. 11A and 11B. As depicted, voltage droop 1112 occurs at time 4 coinciding with the power consumption peak 1105 in FIG. 11B. Notably, voltage droop 1112 takes the system voltage out of a stable system voltage band 1110, which may cause system instability and performance degrading actions on the part of the system to maintain stability, such as frequency throttling.

Figure 12:
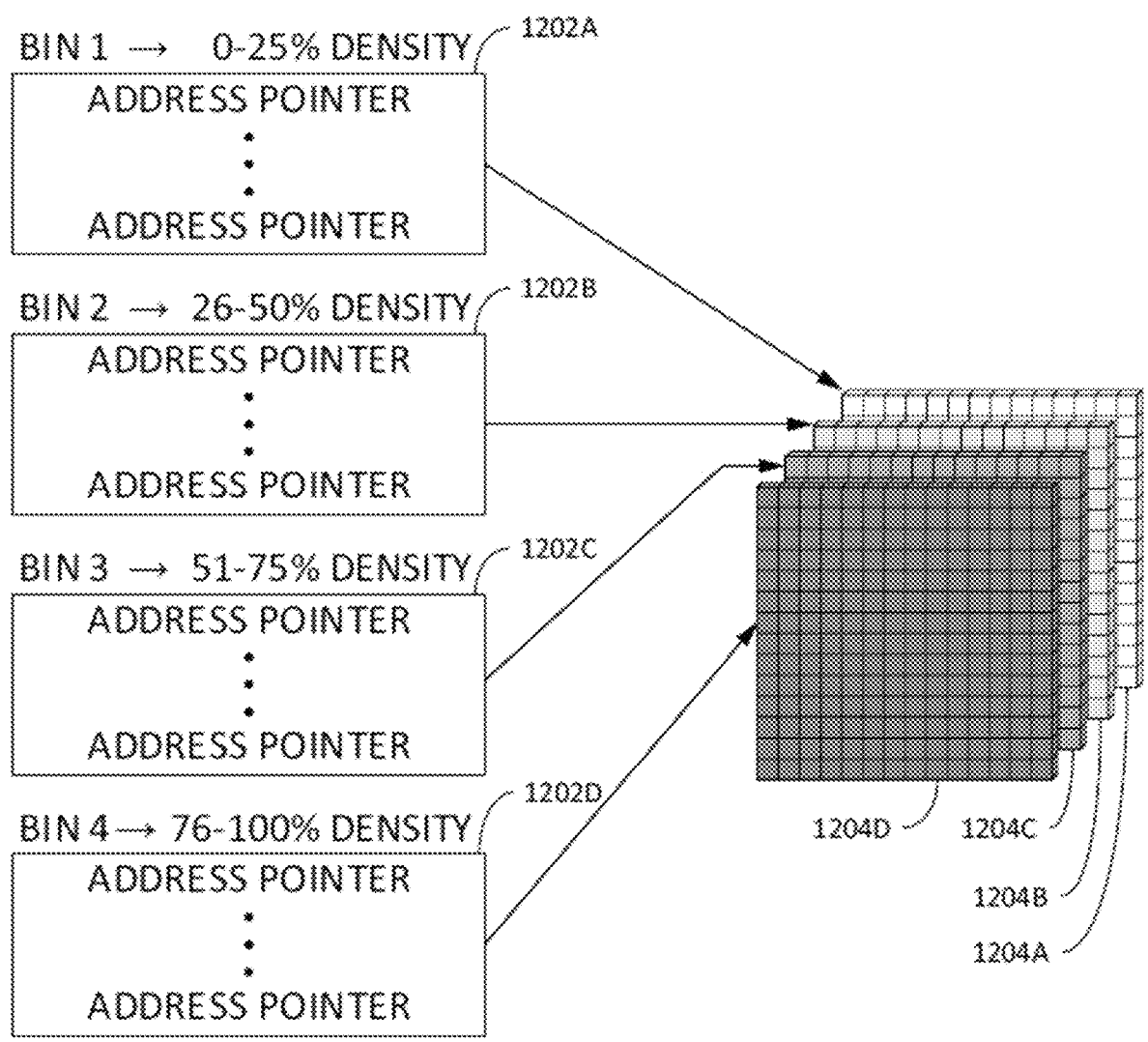
FIG. 12 depicts an example of using density binning on machine learning data.

FIG. 12 depicts an example of using density binning on machine learning data, such as the feature maps depicted in FIG. 10. In particular, bin 1 (1202A) includes address pointers to feature map data 1204A, which has 0-25% density. Similarly, bin 2 (1202B) includes address pointers to feature map data 1204B, which has 26-50% density; bin 3 (1202C) includes address pointers to feature map data 1204C, which has 51-75% density; and bin 4 (1202D) includes address pointers to feature map data 1204D, which has 76-100% density. The binning of address pointers to various features map data of varying density may be performed by, for example, a density analyzer, such as described above (e.g., with respect to FIG. 6).

Multiple processing units may then process the feature maps from the bins in a power efficient manner, such as by reducing peak power ramp (Δi/Δt). For example, a first processing unit may process one feature map from each bin (e.g., 1202A) before processing feature maps from the next bin (e.g., 1202B), such that the resulting processing order in this example is Bin 4 (highest power), Bin 3, Bin 2, Bin 1 (lowest power).

Further, as described above, multiple processing units may stagger the bin processing starting order to minimize initial power ramp and to aggregate current, which minimizes total processing power peak and leakage power. Using the example of FIG. 12, the processing starting orders for four processing units could be: Processing Unit 1: Bin 4, Bin 3, Bin 2, Bin 1; Processing Unit 2: Bin 3, Bin 2, Bin 1, Bin 4; Processing Unit 3: Bin 2, Bin 1, Bin 4, Bin 3; and Processing Unit 4: Bin 1, Bin 4, Bin 3, Bin 2. Notably, these orders are just one example, and others are possible.

Once bin processing begins by parallel processing units, the next binning operation may be pipelined with current processing unit processing using, for example, a circular buffer.

Figure 13:
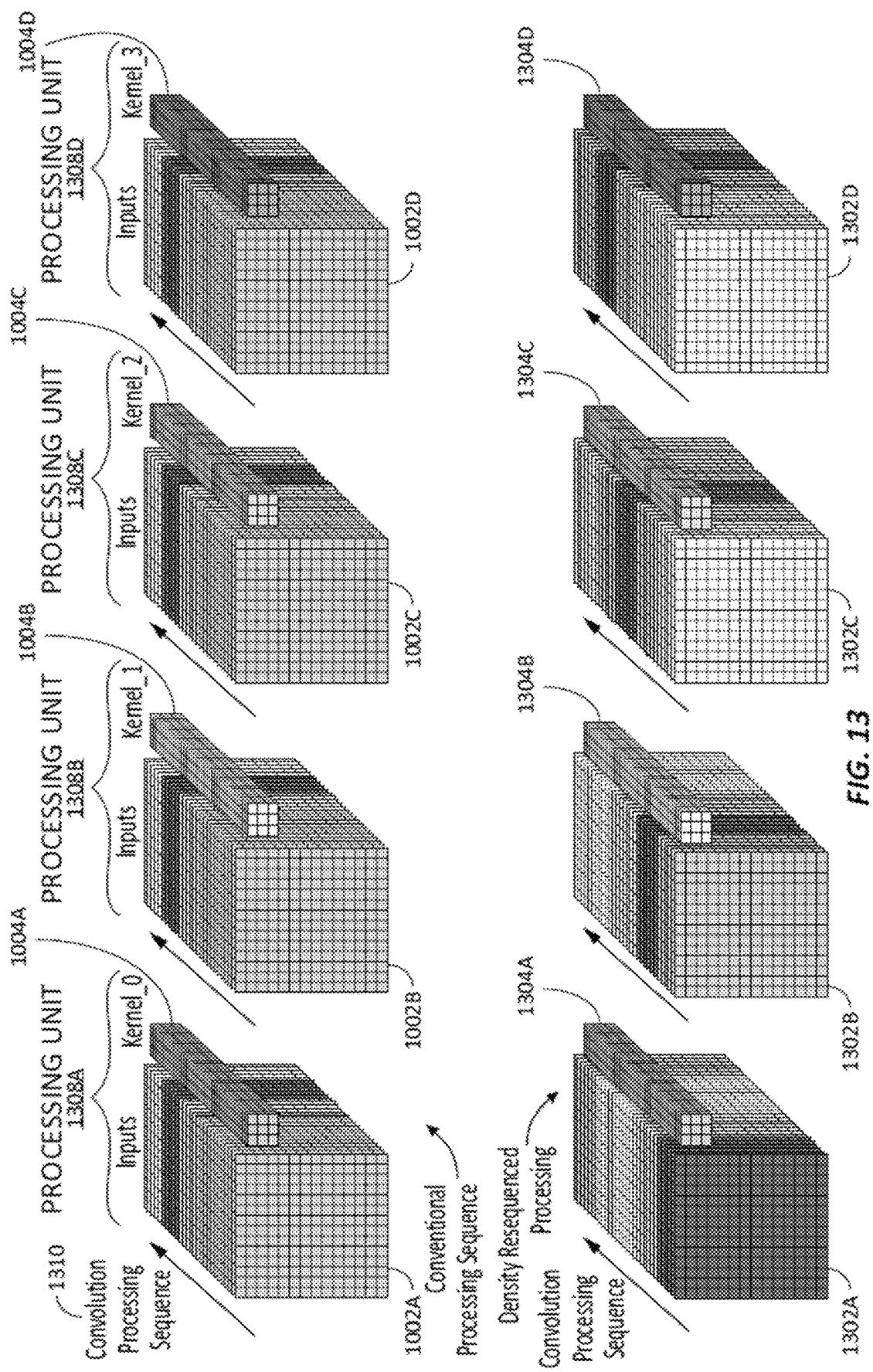
FIG. 13 depicts a comparison of conventional processing of machine learning data blocks with kernels versus density resequenced processing of machine learning data blocks.

FIG. 13 depicts a comparison of conventional processing of machine learning data sub-blocks 1002A-D with kernels 1004A-D versus density resequenced processing of machine learning data sub-blocks 1302A-D with kernels 1304A-D using processing units 1308A-D. Notably this is an example in which each data sub-block 1002A-D and 1302A-D have the same data operated on by a different kernel.

As depicted, the distribution of data densities in sub-blocks 1002A-D is uniform, which results in power spikes for the densest (darkest shaded) data portions as described above. By contrast, the distribution of densities in data sub-blocks 1302A-D is varied due to their density-based resequencing, which generates the benefits described above and further with respect to FIGS. 14A-C. In particular, in this example, data sub-blocks 1302A-D have had both time resequencing and density order resequencing applied.

Figure 14A:
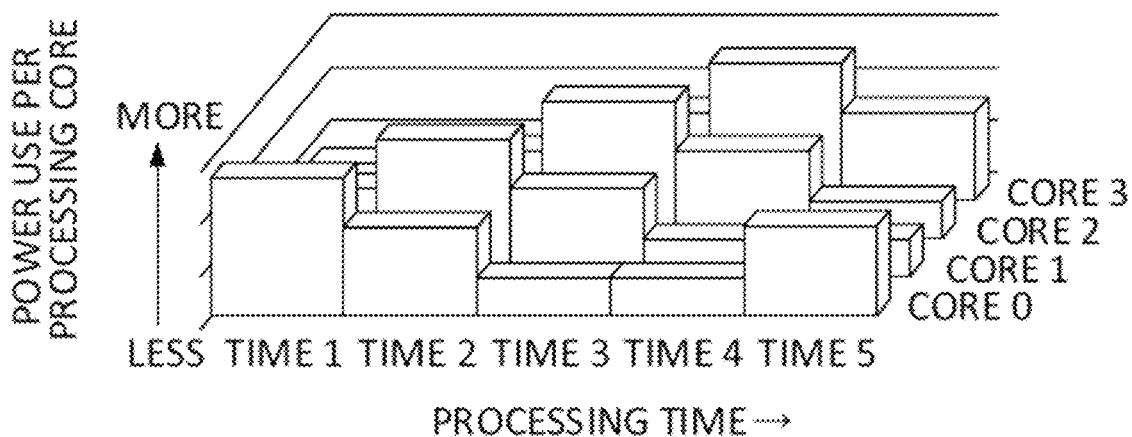
FIGS. 14A-C depict example power effects associated with parallel processing using density binning.

FIG. 14A depicts an example chart of power consumption for a plurality of processing cores processing the data sub-blocks 1302A-D in FIG. 13. Notably, the peak powers for each core are distributed as a consequence of distributing the densest portions of the processed data, as depicted in data sub-blocks 1302A-D in FIG. 13. This is in contrast to the concentration of peak processing powers in FIG. 11A based on the distribution of densities in data sub-blocks 1002A-D in FIG. 10.

Figure 14B:
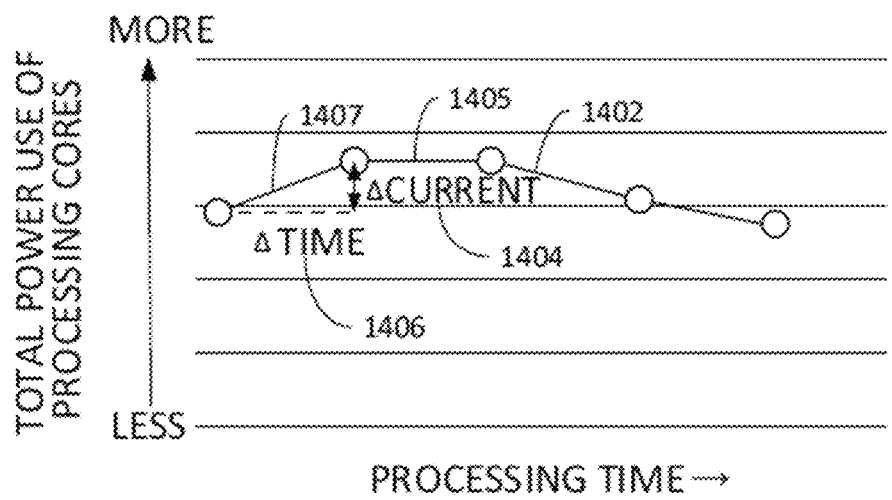

FIG. 14B depicts an example of the total processing power consumption 1402 of cores 0-3 from FIG. 14A. As depicted, the total processing power again varies over time, but the power spike depicted at 1105 in FIG. 11B is eliminated. Further, the change in current 1404 (e.g., Δi) over the change in time 1406 (e.g., Δt) results in a much shallower power ramp 1407 (e.g., Δi/Δt) of power consumption. These improved power consumption characteristics avoid the disruptive power effects, such as a voltage droop, described above with respect to FIG. 11C.

Figure 14C:
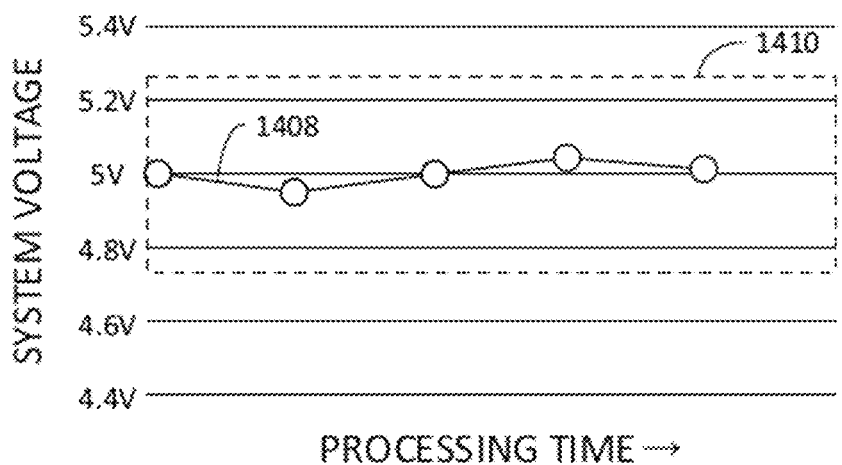

FIG. 14C depicts an example of system voltage 1408 over time, which corresponds in time with FIGS. 14A and 14B. As depicted, there is no significant voltage droop and the system voltage stays within the safe operating band 1410, as compared to the voltage droop 1112 depicted in FIG. 11C. Thus, system instability and performance degrading actions on the part of the system are avoided while processing the same data, just in a resequenced order based on density.

FIG. 15 depicts a useful property of certain machine learning operations when using density resequenced input data.

As depicted, applying an original sequence of feature maps 1502A to a kernel 1504A results in an output feature map 1506. Similarly, a resequenced kernel 1504B can be applied to resequenced (e.g., time and/or density resequenced) input feature maps 1502B to get the same output feature map 1506. Thus, the mathematical results after resequencing are the same as those before and the output feature map need not be independently resequenced in this scenario. Further, the same mathematical results are achieved with the improved system performance as described above.

Example Electronic Device for Parallel Data Processing with Data Resequencing

FIG. 16 depicts an example electronic device 1600 that may be configured to perform parallel data processing with data resequencing, as described herein for example with respect to FIGS. 5 and 7.

Electronic device 1600 includes a central processing unit (CPU) 1602, which in some examples may be a multi-core CPU. Instructions executed at the CPU 1602 may be loaded, for example, from a program memory associated with the CPU.

Electronic device 1600 also includes additional processing components tailored to specific functions, such as a graphics processing unit (GPU) 1604, a digital signal processor (DSP) 1606, a neural signal processing unit (NPU) 1608, a multimedia processing unit 1610, and a wireless connectivity component 1612.

An NPU, such as 1608, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 1608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the curating of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 1608 is a part of one or more of CPU 1602, GPU 1604, and/or DSP 1606.

In some examples, wireless connectivity component 1612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 1612 is further connected to one or more antennas 1614.

Electronic device 1600 may also include one or more sensor processing units 1616 associated with any manner of sensor, one or more image signal processors (ISPs) 1618 associated with any manner of image sensor, and/or a navigation processor 1620, which may include satellite-based positioning system components (e.g., GPS or GLO-NASS) as well as inertial positioning system components.

Electronic device 1600 may also include one or more input and/or output devices 1622, such as screens, touch-sensitive surfaces (including touch-sensitive displays), physical buttons, speakers, microphones, and the like.

In some examples, one or more of the processors of electronic device 1600 may be based on an ARM or RISC-V instruction set.

Electronic device 1600 also includes memory 1624, which is representative of one or more static and/or dynamic memories, such as a dynamic random access memory, a flash-based static memory, and the like. In this example, memory 1624 includes computer-executable components, which may be executed by one or more of the aforementioned processors of electronic device 1600. Though not depicted in FIG. 16, electronic device may include a direct memory access (DMA) controller.

In particular, in this example, memory 1624 includes send component 1624A, receive component 1624B, process component 1624C, determine component 1624D, output component 1624E, sub-block component 1624F, density estimate component 1624G, sequence (or order) component 1624H, and coordinate component 1624I. The depicted components, and others not depicted, may be configured to perform various aspects of the methods described herein.

Generally, electronic device 1600 and/or components thereof may be configured to perform the methods described herein.

Figure 17:
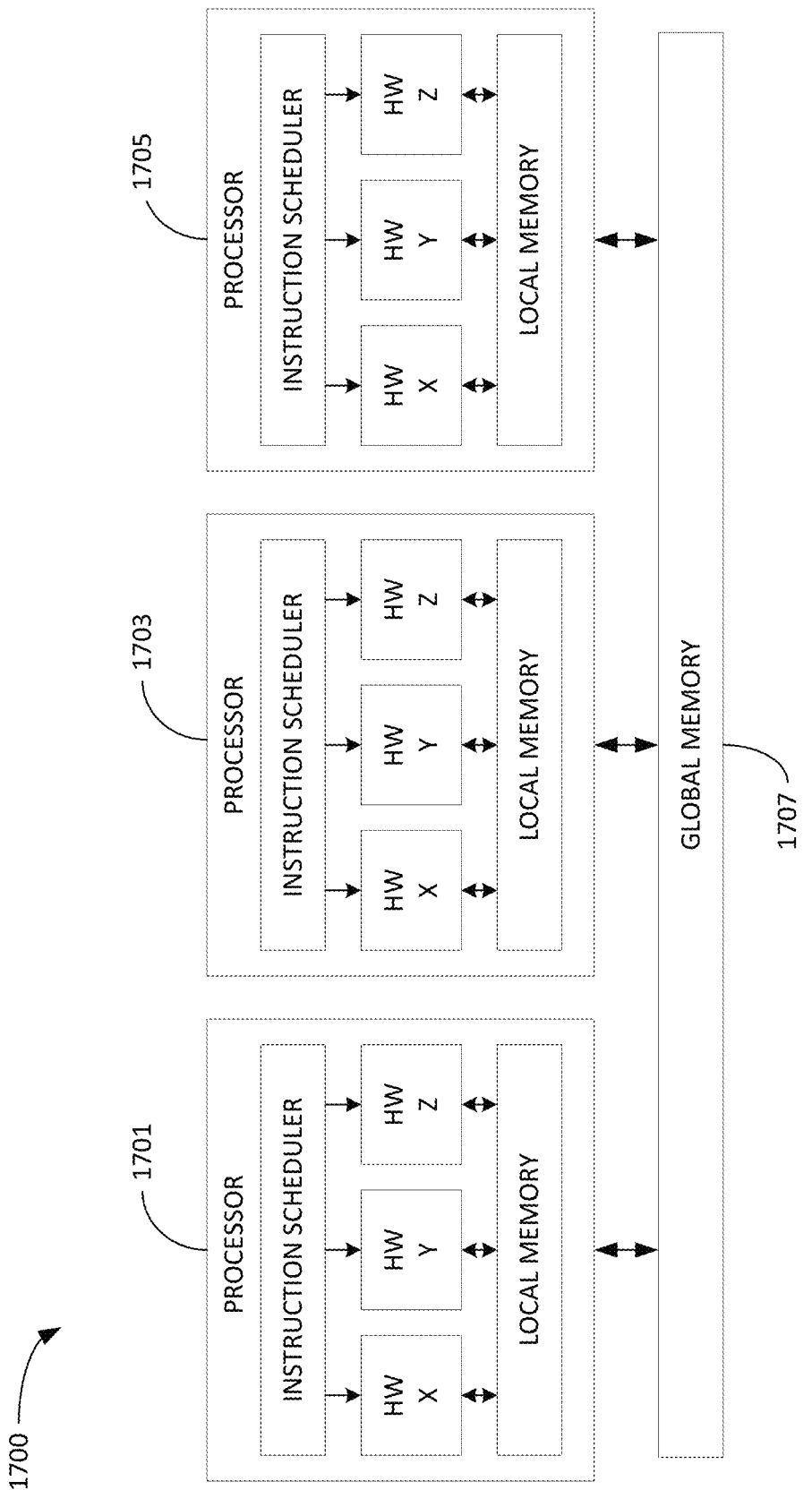
FIG. 17 depicts an example multi-processor processing system that may be implemented with examples described herein.

FIG. 17 depicts an example multi-processor processing system 1700 that may be implemented with examples described herein. For example, multi-processing system 1700 may be representative of various processors of electronic device 1600 of FIG. 16.

In this example, system 1700 includes processors 1701, 1703, and 1705, but in other examples, any number of individual processors may be used. Further, though depicted similarly, processors 1701, 1703, and 1705 may be representative of various different kinds of processors in an electronic device, such as CPUs, GPUs, DSPs, NPUs, and the like as described herein.

Each of processors 1701, 1703, and 1705 includes an instruction scheduler, various hardware sub-components (e.g., hardware X, hardware Y, and hardware Z), and a local memory. In some examples, the local memory may be a tightly coupled memory (TCM). Note that while the components of each of processors 1701, 1703, and 1705 are shown as the same in this example, in other examples, some or each of the processors 1701, 1703, and 1705 may have different hardware configurations, different hardware elements, etc.

Each of processors 1701, 1703, and 1705 is also in data communication with a global memory, such as a DDR memory, or other types of volatile working memory. For example, global memory 1707 may be representative of memory 1624 of FIG. 16.

In some implementations, in a multi-processor processing system such as 1700, one of the processors may act as a master processor. For example, processor 1701 may be a master processor in this example. A master processor may include a compiler that, when executed, can determine how a model, such as a neural network, will be processed by various components of processing system 1700. For example, hardware parallelism may be implemented by mapping portions of the processing of a model to various hardware (e.g., hardware X, hardware Y, and hardware Z) within a given processor (e.g., processor 1701) as well as mapping portions of the processing of the model to other processors (e.g., processors 1703 and 1705) and their associated hardware. For example, the parallel blocks in the parallel block processing architectures described herein may be mapped to different portions of the various hardware in processors 1701, 1703, and 1705.

Examples

Example 1: A method for performing parallel data processing, comprising: receiving data for parallel processing from a data processing requestor; generating a plurality of data sub-blocks; determining a plurality of data portions in each data sub-block of the plurality of data sub-blocks; changing an order of the plurality of data portions in at least one data sub-block of the plurality of data sub-blocks; providing the plurality of data sub-blocks, including the at least one data sub-block comprising the changed order of the plurality of data portions, to a plurality of processing units for parallel processing; and receiving processed data associated with the plurality of data sub-blocks from the plurality of processing units.

Example 2: The method of Example 1, wherein determining a plurality of data portions in each data sub-block of the plurality of data sub-blocks comprises: determining a plurality of density ranges, wherein each density range of the plurality of density ranges is distinct from each other density range of the plurality of density ranges; and determining the plurality of data portions based on the plurality of density ranges.

Example 3: The method of any one of Examples 1 or 2, wherein changing the order of the plurality of data portions for the at least one data sub-block of the plurality of data sub-blocks comprises: time-shifting each data portion of the plurality of data portions along a processing time direction in a circular order.

Example 4: The method of any one of Examples 1-3, wherein changing the order of the plurality of data portions for the at least one data sub-block of the plurality of data sub-blocks comprises: arranging the plurality of data portions according to one of an increasing density order or a decreasing density order.

Example 5: The method of any one of Examples 1-4, further comprising: changing an order of the processed data associated with the plurality of data sub-blocks based on an original order of the plurality of data portions in each data sub-block of the plurality of data sub-blocks; and providing the processed data to the data processing requestor.

Example 6: The method of any one of Examples 1-5, further comprising: changing an order of the plurality of data portions in each data sub-block of the plurality of data sub-blocks.

Example 7: The method of any one of Examples 1-6, wherein determining the plurality of data portions in each data sub-block of the plurality of data sub-blocks is performed by a Direct Memory Access (DMA) controller in data communication with the plurality of processing units.

Example 8: The method of Example 7, wherein changing the order of the plurality of data portions in the at least one data sub-block of the plurality of data sub-blocks is performed by the DMA controller.

Example 9: The method of any one of Example 1-8, wherein changing the order of the plurality of data portions in the at least one data sub-block of the plurality of data sub-blocks comprises reading, by the plurality of processing units, the plurality of data portions in a predefined order.

Example 10: The method of any one of Example 1-9, wherein the plurality of processing units comprise at least one neural signal processing unit.

Example 11: A processing system for performing parallel data processing, comprising: a memory comprising computer-executable instructions; one or more processors configured to execute the computer-executable instructions and cause the processing system to perform a method according to any one of Examples 1-10.

Example 12: A non-transitory computer-readable medium comprising instruction that, when executed by one or more processors of a processing system, cause the processing system to perform a method according to any one of Examples 1-10.

Example 23: A computer program product embodied on a computer readable storage medium and comprising code for performing a method according to any one of Examples 1-10.

Example 14: A method for performing parallel data processing, comprising: receiving data for parallel processing from a data processing requestor; determining a plurality of density ranges, wherein each density range of the plurality of density ranges is distinct from each other density range of the plurality of density ranges; determining a plurality of data portions of the data based on the density ranges; generating a plurality of data sub-blocks having resequenced data portions; providing the plurality of data sub-blocks to a plurality of processing units for parallel processing; and receiving processed data associated with the plurality of data sub-blocks from the plurality of processing units.

Example 15: The method of Example 14, wherein determining the plurality of data portions of the data based on the density ranges comprises: determining a density for each respective data portion of the plurality of data portions; and assigning each respective data portion of the plurality of data portions to one density bin of a plurality of density bins based on the determined density for the respective data portion, wherein each density bin is associated with one density range of the plurality of density ranges.

Example 16: The method of Example 15, wherein generating the plurality of data sub-blocks having resequenced data portions comprises: adding data portions to the plurality of data sub-blocks according to a plurality of bin sequences, wherein each bin sequence of the plurality of bin sequences comprises a unique sequence of the plurality of density bins.

Example 17: The method of Example 16, further comprising: assigning each bin sequence of the plurality of bin sequences to one or more processing units of the plurality of processing units, wherein each respective data sub-block of the plurality of data sub-blocks is provided to one processing unit of the plurality of processing units based on the respective data sub-block's assigned bin sequence.

Example 18: The method of Example 16, further comprising: determining the plurality of bin sequences according to: one of an increasing density order or a decreasing density order; and a processing order time shift.

Example 19: The method of any one of Examples 14-18, further comprising; providing the processed data to the data processing requestor.

Example 20: The method of any one of Examples 14-19, wherein: the data for parallel processing is machine learning model input data for a convolutional neural network model, each data portion of the plurality of data portions comprises a feature map, and the method further comprises: resequencing a convolutional kernel for each respective data sub-block of the plurality of data sub-blocks based on a sequence of data portions in the respective data sub-block; and applying the resequenced convolutional kernel to the respective data sub-block.

Example 21: The method of any one of Examples 14-20, wherein determining the plurality of data portions of the data based on the density ranges is performed by a Direct Memory Access (DMA) controller in data communication with the plurality of processing units.

Example 22: The method of Example 21, wherein generating the plurality of data sub-blocks having resequenced data portions is performed by the DMA controller.

Example 23: The method of any of Examples 14-20, wherein the plurality of processing units comprise at least one neural signal processing unit.

Example 24: A processing system for performing parallel data processing, comprising: a memory comprising computer-executable instructions; one or more processors configured to execute the computer-executable instructions and cause the processing system to perform a method according to any one of Examples 14-23.

Example 25: A non-transitory computer-readable medium comprising instruction that, when executed by one or more processors of a processing system, cause the processing system to perform a method according to any one of Examples 14-23.

Example 26: A computer program product embodied on a computer readable storage medium and comprising code for performing a method according to any one of Examples 14-23.

Additional Considerations

The preceding description is provided to enable any person skilled in the art to practice the various examples and examples described herein. The examples discussed herein are not limiting of the scope, applicability, or examples set forth in the claims. Various modifications to these examples will be readily apparent to those skilled in the art, and the generic principles defined herein may be applied to other examples. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the examples shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of processing a plurality of data sub-blocks in corresponding ones of a plurality of processing units, comprising:
   analyzing densities of a plurality of data portions for each of the plurality of data sub-blocks;
   based on the densities of the plurality of data portions, changing an order of the plurality of data portions in at least one of the plurality of data sub-blocks, wherein the order of the plurality of data portions for each of the plurality of data sub-blocks is a processing order or time of the plurality of data portions in each of the plurality of data sub-blocks; and
   processing the plurality of data sub-blocks, including the at least one of the data sub-block comprising the changed order of the plurality of data portions by the corresponding ones of the plurality of processing units.

2. The method of claim 1, further comprising generating the plurality of data sub-blocks from data received for parallel processing.

3. The method of claim 2, wherein the data received for parallel processing is provided by an application.

4. The method of claim 2, wherein the data received for parallel processing is a multi-dimensional data block.

5. The method of claim 4, wherein the densities is measured by a proportion of non-null entries in various dimensions of the data.

6. The method of claim 2, wherein the data received for parallel processing is machine learning model input data.

7. The method of claim 1, wherein the analyzing densities of the plurality of data portions for each of the plurality of data sub-blocks comprises:
   determining a plurality of density ranges, wherein each density range of the plurality of density ranges is distinct from each other density range of the plurality of density ranges; and
   determining the plurality of data portions based on the plurality of density ranges.

8. The method of claim 1, wherein changing the order of the plurality of data portions in the at least one of the plurality of data sub-blocks comprises: time-shifting each data portion of the plurality of data portions along a processing time direction in a circular order.

9. The method of claim 1, wherein the plurality of processing units comprise at least one neural signal processing unit.

10. A system for processing a plurality of data sub-blocks, comprising:
    a density analyzer configured to analyze densities of a plurality of data portions for each of the plurality of data sub-blocks;
    a sequencer configured to receive the density of the plurality of data portions and change an order of the plurality of data portions in at least one of the plurality of data sub-blocks, wherein the order of the plurality of data portions for each of the plurality of data sub-blocks is a processing order or time of the plurality of data portions in each of the plurality of data sub-blocks; and
    a plurality of processing units configured to process the plurality of data sub-blocks, including the at least one data sub-block comprising the changed order of the plurality of data portions.

11. The system of claim 10, further comprising a processing coordination configured to generate the plurality of data sub-blocks from data received for parallel processing.

12. The system of claim 11, wherein the data received for parallel processing is provided by an application.

13. The system of claim 11, wherein the data received for parallel processing is a multi-dimensional data block.

14. The system of claim 13, wherein the densities is measured by a proportion of non-null entries in various dimensions of the data.

15. The system of claim 11, wherein the data received for parallel processing is machine learning model input data.

16. The system of claim 10, wherein the density analyzer is configured to
    determine a plurality of density ranges, wherein each density range of the plurality of density ranges is distinct from each other density range of the plurality of density ranges; and
    determine the plurality of data portions based on the plurality of density ranges.

17. The system of claim 10, wherein the densities is measured by a proportion of non-null entries in various dimensions of data.

18. The system of claim 10, wherein the plurality of processing units comprise at least one neural signal processing unit.

19. The system of claim 18, further comprising a tightly coupled memory (TCM) associated with the neural signal processing unit.

20. The system of claim 10, wherein the density analyzer and the sequencer is part of a directly memory access (DMA).

* * * * *